(12) United States Patent
Sakugawa

(10) Patent No.: US 7,143,205 B2
(45) Date of Patent: Nov. 28, 2006

(54) DMA CONTROLLER HAVING A TRACE BUFFER

(75) Inventor: Mamoru Sakugawa, Tokyo (JP)

(73) Assignee: Renesas Technology Corp., Tokyo (JP)

( * ) Notice: Subject to any disclaimer, the term of this patent is extended or adjusted under 35 U.S.C. 154(b) by 143 days.

(21) Appl. No.: 10/163,507

(22) Filed: Jun. 7, 2002

(65) Prior Publication Data

US 2002/0194401 A1 Dec. 19, 2002

(30) Foreign Application Priority Data

Jun. 18, 2001 (JP) .............................. 2001-183658

(51) Int. Cl.
*G06F 13/28* (2006.01)
*G06F 11/34* (2006.01)

(52) U.S. Cl. .......................... 710/22; 710/28; 710/15; 714/45

(58) Field of Classification Search .................. 710/22, 710/23, 24, 25, 26, 27, 28; 709/212; 711/100
See application file for complete search history.

(56) References Cited

U.S. PATENT DOCUMENTS

| 4,901,234 | A | * | 2/1990 | Heath et al. | ................... 710/40 |
| 5,212,795 | A | * | 5/1993 | Hendry | ......................... 710/28 |
| 5,828,856 | A | * | 10/1998 | Bowes et al. | ................ 710/308 |
| 6,199,121 | B1 | * | 3/2001 | Olson et al. | ................... 710/24 |
| 6,332,206 | B1 | * | 12/2001 | Nakatsuji et al. | ........... 714/755 |
| 6,473,841 | B1 | * | 10/2002 | Ueda et al. | .................. 711/156 |
| 2001/0055323 | A1 | * | 12/2001 | Rowett et al. | .............. 370/537 |

FOREIGN PATENT DOCUMENTS

| JP | 59221131 A | * | 12/1984 |
| JP | 61286956 A | * | 12/1986 |
| JP | 0793233 | | 4/1995 |
| JP | 2000132499 A | * | 5/2000 |
| JP | 2001325121 A | * | 11/2001 |

* cited by examiner

*Primary Examiner*—Ilwoo Park
(74) *Attorney, Agent, or Firm*—Buchanan Ingersoll & Rooney PC

(57) ABSTRACT

A DMA controller comprises an arbitration unit for arbitrating among a plurality of channels so as to select a DMA request from among a plurality of DMA requests accepted by way of the plurality of channels according to priorities assigned to the plurality of channels in advance, and a trace buffer for storing trace data associated with the DMA request selected by the arbitration unit. The DMA controller can also include a write control unit for enabling or disabling writing of the trace data associated with the DMA request selected by the arbitration unit in the trace buffer.

20 Claims, 14 Drawing Sheets

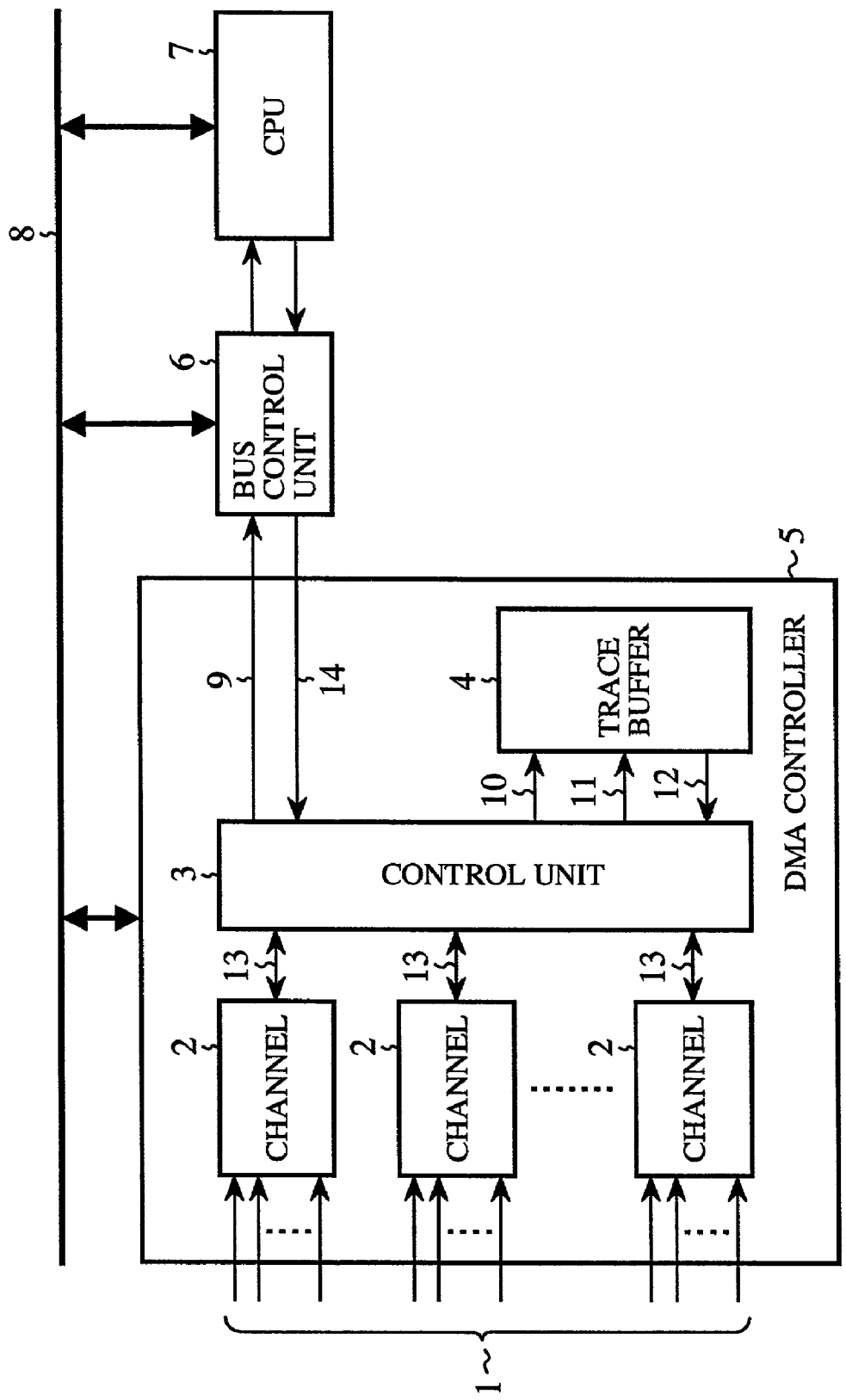

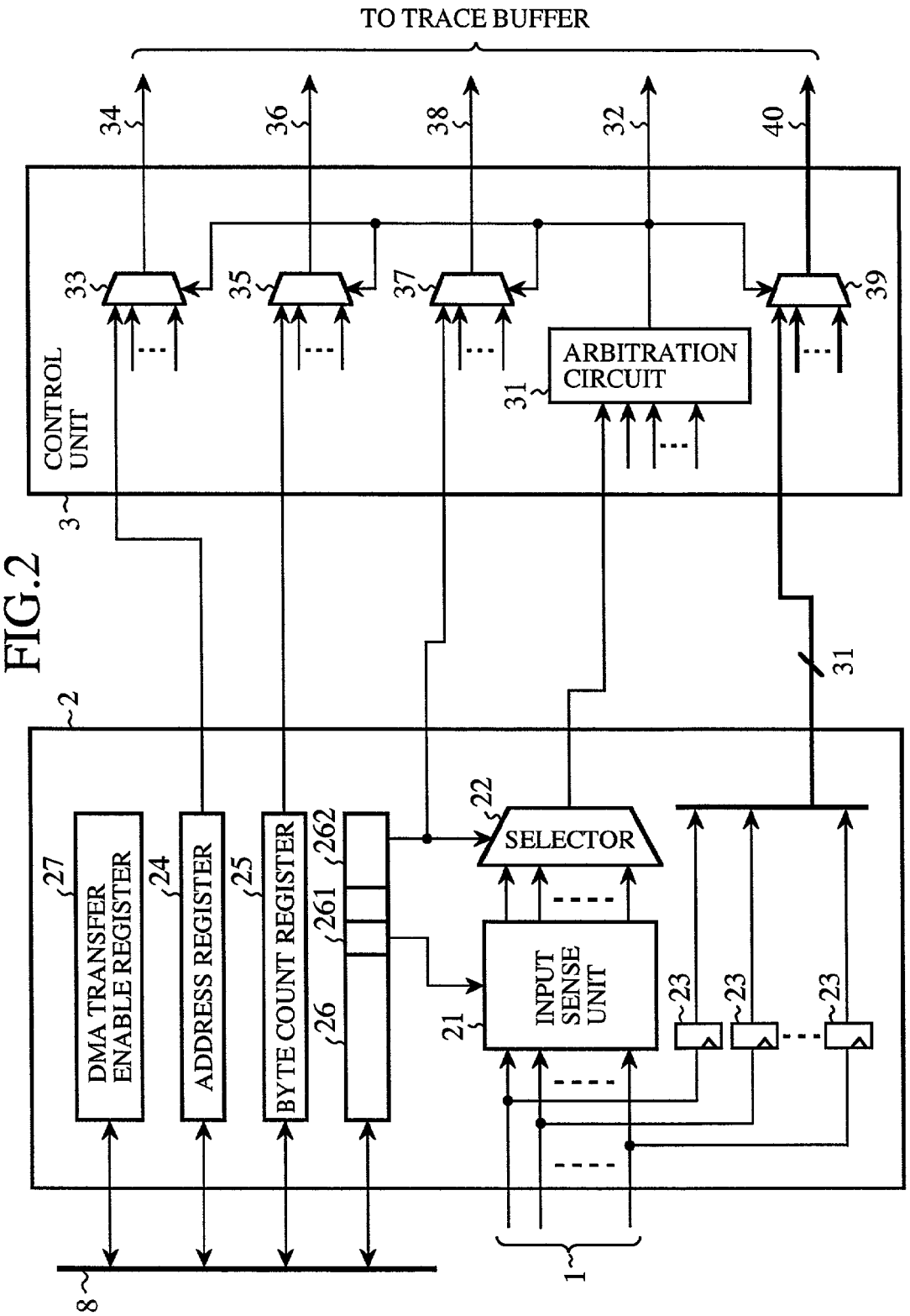

FIG.3

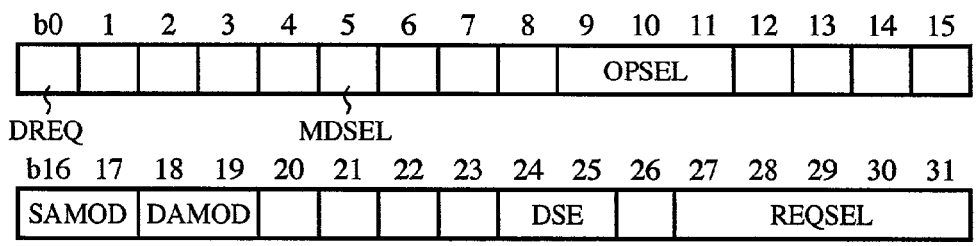

DMA CONTROL REGISTER

| 0: | DREQ | DMA REQUEST FIELD |
|---|---|---|
| 5: | MDSEL | DMA TRANSFER MODE SELECTION FIELD<br>0: BUS-ACCESS RIGHT CONTINUOUS ACQUISITION<br>1: CYCLE STEAL |
| 9~11 | OPSEL | 1-OPERAND TRANSFER DATA NUMBER SELECTION FIELD<br>000: 1 DATA    100: 16 DATA<br>001: 2 DATA    101: 32 DATA<br>010: 4 DATA    110: 64 DATA<br>011: 8 DATA    111: 128 DATA |
| 16~17 | SAMOD | SOURCE ADDRESSING MODE SELECTION FIELD<br>00: FIXED<br>01: PLUS<br>10: MINUS |
| 18~19 | DAMOD | DESTINATION ADDRESSING MODE SELECTION FIELD<br>00: FIXED<br>01: PLUS<br>10: MINUS |
| 24~25 | DSE | DMA REQUEST INPUT SENSE MODE SELECTION FIELD<br>00: RISING EDGE<br>01: HIGH LEVEL<br>10: FALLING EDGE<br>11: LOW LEVEL |
| 27~31 | REQSEL | DMA REQUEST FACTOR SELECTION FIELD<br>00000: SOFTWARE<br>00001: EXTERNAL INPUT 1<br>00010: EXTERNAL INPUT 2<br>00100: INTERNAL TIMER<br>01000: SERIAL I/O |

⋮

DMA CONTROLLER HAVING A TRACE BUFFER

BACKGROUND OF THE INVENTION

1. Field of the Invention

The present invention relates to a DMA controller provided with a trace buffer for storing trace data to assist the debugging of a program or a system, in a semiconductor integrated circuit equipped with a functional module such as a CPU, and a semiconductor integrated circuit provided with the DMA controller.

2. Description of the Prior Art

Conventionally, in a semiconductor integrated circuit provided with a functional module, such as CPU, and a DMA controller, to assist the debugging of a program or a system, a method of tracing addresses and data transmitted by way of a bus connected to both the functional module and the DMA controller is used.

Referring now to FIG. 20, there is illustrated a block diagram showing the structure of terminal equipment and a data collector which implements an example of such a prior art trace method as disclosed in Japanese patent application publication (TOKKAIHEI) No. 2-308345. In the figure, reference numeral 80 denotes a microprocessor, reference numeral 81 denotes an I/O control circuit, reference numeral 82 denotes a DMA controller, reference numeral 83 denotes a memory, reference numeral 84 denotes a data bus, and reference numeral 85 denotes a synchronous circuit. The terminal equipment consists of the microprocessor 80, the I/O control circuit 81, the DMA controller 82, the memory 83, the data bus 84, and the synchronous circuit 85. Furthermore, reference numeral 86 denotes a trace memory, and reference numeral 87 denotes a data display apparatus. The data collector for collecting trace data from the terminal equipment consists of the trace memory 86 and the data display apparatus 87.

In operation, when the I/O control circuit 81 receives a request for data transfer of input data from the microprocessor 80, the I/O control circuit 81 outputs a request signal 88 to the DMA controller 82. In response to the request signal 88, the DMA controller 82 confirms whether or not the data bus 84 is being used by the microprocessor 80, and, if not, outputs a response signal 89 to both the I/O control circuit 81 and the synchronous circuit 85. The DMA controller 82 also outputs a memory write signal 90 to the memory 83 simultaneously. The I/O control circuit 81 outputs data to be transferred to the memory 83 onto the data bus 84 while the response signal 89 is being input thereto. The synchronous circuit 85 latches the data on the data bus 84 in response to a falling edge of the response signal 89, and simultaneously outputs a trace request signal 91 to the trace memory 86 of the data collector and outputs the latched data onto a trace data bus 92. The trace memory 86 writes data on the trace data bus 92 therein in response to the trace request signal 91. When the writing is completed, the trace memory 86 outputs a write end signal 93 to the synchronous circuit 85, and the synchronous circuit 85 stops the output of the trace request signal 91 in response to the write end signal 93. The terminal equipment and the data collector can collect data to be stored in the memory 83 by repeating such a sequence of operations. The collected data is then displayed in the data display apparatus 87.

A problem with a prior art trace method implemented as above is that though it is possible to perform a control operation so that trace data includes no data associated with CPU accesses, the trace data generally includes data associated with transfers by other bus masters and only data associated with an address bus can be extracted, and therefore it is difficult to extract only traced at a associated with the DMA controller. Furthermore, in accordance with the trace method as shown in FIG. 20, though it is possible to extract the trace data associated with the DMA controller 82, when the DMA controller 82 has a lot of channels, it is difficult to trace information on channel transitions. Accordingly, it is very difficult to determine whether or not the allocation of DMA request sources is appropriate on the system level and whether or not the frequency with which DMA requests are made is appropriate.

SUMMARY OF THE INVENTION

The present invention is proposed to solve the above-mentioned problems, and it is therefore an object of the present invention to provide a DMA controller that enables extraction of trace data only associated with the DMA controller, and that, by enabling trace of information on each channel of the DMA controller, can strongly support debugging on the system level, and a semiconductor integrated circuit containing the DMA controller.

In accordance with an aspect of the present invention, there is provided a DMA controller including: an arbitration unit for arbitrating among a plurality of channels so as to select a DMA request from among a plurality of DMA requests accepted by way of the plurality of channels according to priorities assigned to the plurality of channels in advance; and a trace buffer for storing trace data associated with the DMA request selected by the arbitration unit. Accordingly, the DMA controller makes it possible to easily determine if DMA transfers that are not to be intended have been activated, if the assignment of the priorities to the plurality of channels is appropriate, if wrong addressing has been done, and if DMA transfers have been carried out properly, thus facilitating the debugging of any program.

In accordance with another aspect of the present invention, there is provided a semiconductor integrated circuit including: a DMA controller including an arbitration unit for arbitrating among a plurality of channels so as to select a DMA request from among a plurality of DMA requests accepted by way of the plurality of channels according to priorities assigned to the plurality of channels in advance, and a trace buffer for storing trace data associated with the DMA request selected by the arbitration unit; a functional module, such as a CPU, connected to the DMA controller by way of a bus; a bus control unit for arbitrating between the DMA controller and the functional module for right to use the bus; and a debugging interface circuit having an access function of accessing either the functional module or the DMA controller according to a command applied thereto, and a debugging function. Accordingly, the semiconductor integrated circuit makes it possible to easily determine if DMA transfers that are not to be intended have been activated, if the assignment of the priorities to the plurality of channels is appropriate, if wrong addressing has been done, and if DMA transfers have been carried out properly. In addition, the semiconductor integrated circuit can facilitate the debugging of any program.

Further objects and advantages of the present invention will be apparent from the following description of the preferred embodiments of the invention as illustrated in the accompanying drawings.

BRIEF DESCRIPTION OF THE DRAWINGS

FIG. 1 is a block diagram showing the structure of a DMA controller according to a first embodiment of the present invention, and a semiconductor integrated circuit containing the DMA controller;

FIG. 2 is a block diagram showing the structure of each channel and a control unit of the DMA controller as shown in FIG. 1;

FIG. 3 is a diagram showing the structure of a DMA control register for each channel as shown in FIG. 2;

DETAILED DESCRIPTION OF THE PREFERRED EMBODIMENTS

Figure 4:
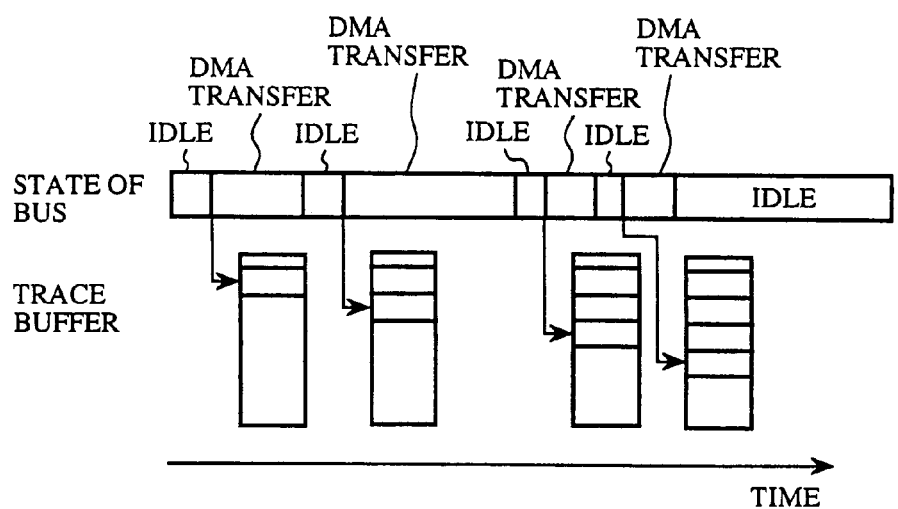
FIG. 4 is a diagram showing storage processes of storing trace data in a trace buffer using DMA transfers by the DMA controller according to the first embodiment of the present invention.

Embodiment 1.

Referring now to FIG. 1, there is illustrated a block diagram showing the structure of a DMA controller according to a first embodiment of the present invention and a semiconductor integrated circuit including the DMA controller. In the figure, reference numeral 1 denote DMA request signals applied to the DMA controller 5, reference numeral 2 denotes a channel of the DMA controller 5, reference numeral 3 denotes a control unit that controls the DMA controller 5, and that also serves as an I/O interface between the DMA controller 5 and a bus 8, reference numeral 4 denotes a trace buffer, reference numeral 6 denotes a bus control unit connected to the control unit 3 of the DMA controller 5, for arbitrating among a functional module 7, such as a CPU, connected to the bus 8, the DMA controller 5, etc. for the right to use the bus 8, reference numeral 9 denotes a control signal transmitted from the DMA controller 5 to the bus control unit 6, reference numeral 14 denotes a DMA transfer enable signal transmitted from the bus control unit 6 to the DMA controller 5, reference numeral 10 denotes a write request signal output from the control unit 3 of the DMA controller 5 to the trace buffer 4, reference numeral 11 denotes trace data output from the control unit 3 to the trace buffer 4, the trace data including a selected channel number, addresses of a source of transfer and a destination of transfer associated with the selected channel number, the states of DMA request signals, DMA request factor data, and data on the number of data to be transferred, reference numeral 12 denotes trace data read out of the trace buffer 4, and reference numeral 13 denotes an interface signal transmitted between each channel 2 and the control unit 3.

FIG. 2 is a block diagram showing the structure of each channel 2 of the DMA controller 5 and the control unit 3. In the figure, reference numeral 21 denotes an input sense unit for detecting a plurality of (e.g., 31) DMA request signals 1, reference numeral 22 denotes a selector for selecting one output from a plurality of outputs each showing a DMA request from the input sense unit 21 and for outputting the selected output, reference numeral 23 denotes a flip-flop for holding the state of a corresponding one of the plurality of DMA request signals 1, reference numeral 24 denotes an address register in which the addresses of a source of transfer and a destination of transfer are stored, reference numeral 25 denotes a byte count register in which the number of data to be transferred is stored, reference numeral 26 denotes a DMA control register in which information used to control the DMA controller 5 is stored, reference numeral 261 denotes a field disposed in the DMA control register 26, in which a value specifying the sense conditions of the input sense unit 21 is stored, and reference numeral 262 denotes a field disposed in the DMA control register 26, in which a value specifying which DMA request factor the selector 22 will select is stored. Each channel 2 outputs the value of the field 262 to the control unit 3 as DMA request factor data. Furthermore, reference numeral 27 denotes a 1-bit DMA transfer enable register to which 1 is set when DMA transfers are enabled.

Reference numeral 31 denotes an arbitration circuit for arbitrating among the plurality of channels 2 so as to select a DMA request from one channel from among a plurality of DMA requests from the plurality of channels 2, reference numeral 32 denotes a channel number selected by the arbitration circuit 31, reference numeral 33 denotes an address selector for selecting one address data from a plurality of address data, each of which indicates the addresses of a source of transfer and a destination of transfer, sent from the plurality of channels 2 according to the channel number sent from the arbitration circuit 31, reference numeral 34 denotes the address data selected by the address selector 33, reference numeral 35 denotes a byte count selector for selecting one transfer data number data on the number of data to be transferred from among a plurality of transfer data number data sent from the plurality of channels 2 according to the channel number sent from the arbitration circuit 31, reference numeral 36 denotes a byte count for indicating the transfer data number data selected by the byte count selector 35, reference numeral 37 denotes a DMA request factor selector for selecting one DMA request factor data from among a plurality of DMA request factor data sent from the plurality of channels 2 according to the channel number sent from the arbitration circuit 31, reference numeral 38 denotes the DMA request factor data selected by the DMA request factor selector 37, reference numeral 39 denotes a DMA request signal value selector for selecting one DMA request signal value set from among a plurality of DMA request signal value sets sent from the plurality of channels 2 according to the channel number sent from the arbitration circuit 31, and reference numeral 40 denotes the DMA request signal value set selected by the DMA request signal value selector 39. To confirm whether DMA request signals are correctly input when debugging is done, each channel outputs all input DMA request signal values to the DMA request signal value selector 39 of the control unit 3.

Referring now to FIG. 3, there is illustrated a diagram showing an example of the DMA control register 26. The DMA control register 26 as shown in FIG. 3 is a 32-bit register and includes fields as shown in the figure. DREQ is a DMA request field which is set to 1 when each channel recognizes a DMA request signal, and DREQ is cleared to 0 when a DMA transfer is started. MDSEL is a DMA transfer mode selection field. When MDSEL is set to 1, a cycle steal mode in which each channel gives others the right to use the bus every time a transfer of one data is carried out is selected. When MDSEL is set to 0, a bus right continuous-acquisition mode in which each channel remains having the right to use the bus while a one-operand transfer is carried out is selected. OPSEL is a one-operand transfer data number selection field that indicates the number of data to be transferred every time one DMA request is made. SAMOD is a source addressing mode selection field that selects an addressing mode in which the source of transfer is placed. DAMOD is a destination addressing mode selection field that selects an addressing mode in which the destination of transfer is placed. DSE is a DMA request input sense mode selection field that selects a sense mode in which the input sense unit 21 of FIG. 2 is placed, and corresponds to the field 261 of the DMA control register 26 of FIG. 2. REQSEL is a DMA request factor selection field that stores a value for specifying which, DMA request factor the selector 22 of FIG. 2 will select, and corresponds to the field 262 of the DMA control register 26 of FIG. 2.

In operation, the DMA controller 5 can respond to a DMA request signal transmitted from an external terminal of the semiconductor integrated circuit which includes the DMA controller 5, an internal timer, or a serial I/O, and can perform a direct transfer of data without having to use the functional module 7, such as a CPU. The DMA controller 5 has a plurality of channels 2, and can accept a plurality of DMA request signals 1 for each channel. The DMA controller 5 can specify the addresses of a source of transfer and a destination of transfer, the number of data to be transferred, selection of a DMA request factor, and addressing modes, for each channel.

Each channel 2 of the DMA controller 5 operates independently, and, in response to a DMA request signal 1, makes a request of the control unit 3 for a DMA transfer. When each channel 2 receives a DMA request signal from an external terminal, an internal timer, a serial I/O, or the like, the input sense unit 21 of each channel 2 detects the DMA request signal 1. In this case, the input sense unit 21 detects the DMA request signal 1 applied thereto in anyone of rising edge sense mode, High-level sense mode, falling edge sense mode, and Low-level sense mode, according to the value stored in the DMA request input sense mode selection field 261 of the DMA control register 26. In addition, the selector 22 selects one DMA request signal from a plurality of DMA request signals 1 detected by the input sense unit 21 according to the value stored in the DMA request factor selection field 262 of the DMA control register 26, and then sends the selected DMA request signal 1 to the arbitration circuit 31 of the control unit 3.

Furthermore, in each channel 2, the address register 24 stores the addresses of the source of transfer and the destination of transfer, and sends address data specifying the set of the addresses of the source of transfer and the destination of transfer to the address selector 33 of the control unit 3. The contents of the address register 24 are updated every time a DMA transfer is carried out. The byte count register 25 stores the number of data to be transferred, and then sends data on the number of data to be transferred to the byte count selector 35 of the control unit 3. The byte count register 25 is decremented every time a data transfer is carried out. The DMA control register 26 sends a value, i.e., data on a DMA request factor, which is stored in the DMA request factor selection field 262, to the DMA request factor selector 37. Furthermore, a plurality of flip-flops 23 hold the states of all DMA request signals 1 applied to each channel 2, and send those values to the DMA request signal value selector 39.

The arbitration circuit 31 selects one DMA request signal 1 transmitted from one channel from among a plurality of DMA request signals 1 transmitted from the plurality of channels 2 according to priorities assigned to the plurality of channels 2 in advance. In other words, the arbitration circuit 31 arbitrates among the plurality of channels and outputs a channel number 32 of a selected channel. The address selector 33 selects address data 34 on the selected channel, i.e., the addresses of a source of transfer and a destination of transfer from among a plurality of address data sent from the plurality of channels 2 according to the channel number 32 sent from the arbitration circuit 31, and then sends the address data 34 to the trace buffer 4. The byte count selector 35 selects one transfer data number data 36 from among the a plurality of transfer data number data sent from the plurality of channels 2 according to the channel number 32 sent from the arbitration circuit 31, and then sends the selected transfer data number data 36 to the trace buffer 4.

The DMA request factor selector 37 selects one DMA request factor data 38 from among a plurality of DMA request factor data sent from the plurality of channels 2 according to the channel number 32 sent from the arbitration circuit 31, and sends the selected DMA request factor data 38 to the trace buffer 4. The DMA request signal value selector 39 selects one DMA request signal value set 40 from the selected channel according to the channel number 32 sent from the arbitration circuit 31, and then sends the selected DMA request signal value set 40 to the trace buffer 4.

Thus, the control unit 3 arbitrates among the plurality of channels 2 for DMA requests so as to select one channel. The control unit 3 then outputs a control signal 9 that directs a start of DMA transfer to the bus control unit 6. When the DMA controller 5 receives a DMA transfer enable signal 14 from the bus control unit 6, the DMA controller 5 starts a DMA transfer according to the settings of the selected channel 2. In addition, the control unit 3 outputs trace data 11 including at least the selected channel number 32, the address data 34 on the addresses of the source of transfer and the destination of transfer associated with a channel specified by the selected channel number 32, the transfer data number data 36, the DMA request factor data 38, and the DMA request signal value set 40 to the trace buffer 4. The trace buffer 4 writes the trace data 11 received therein in response to a write request signal 10 similarly output from the control unit 3.

FIG. 4 is a diagram showing trace data storage processes of storing trace data in the trace buffer 4 using DMA transfers. In the example of FIG. 4, four DMA transfers are carried out successively. No DMA transfer is carried out within a time period designated by "Idle" between the four DMA transfers, and other bus masters like the functional module 7 etc. can use the bus 8 during the time period. When a first DMA transfer is started, the DMA controller 5 writes trace data 11 including at least a selected channel number 32, address data 34 on the addresses of a source of transfer and a destination of transfer associated with a channel specified by the selected channel number 32, transfer data number data 36, DMA request factor data 38, and one DMA request signal value set 40 into the trace buffer 4. When a second DMA transfer is started, the DMA controller 5 writes trace data 11 associated with a selected channel into a next area of the trace buffer 4. When either of third and fourth DMA transfers is started, the DMA controller 5 writes trace data 11 associated with a similarly selected channel into the trace buffer 4.

Figure 5:
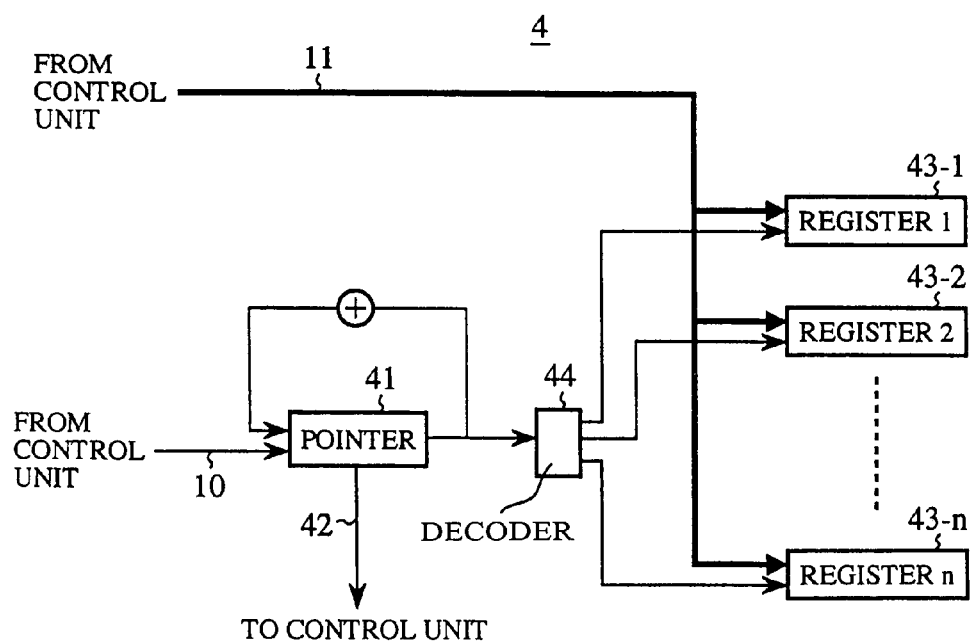
FIG. 5 is a block diagram showing the structure of an example of a trace buffer of the DMA controller according to the first embodiment of the present invention.

FIG. 5 is a block diagram showing the structure of an example of the trace buffer 4 of the DMA controller 5 according to the first embodiment of the present invention. In the figure, reference numeral 41 denotes a pointer that receives a write request signal 10, as an update flag, from the control unit 3, and that increments its value by 1 every time it receives the write request signal 10, reference numeral 42 denotes an overflow flag that is output to the control unit 3 of FIG. 1 when the pointer 41 overflows, i.e., when the trace buffer 4 reaches full, reference numerals 43-1 to 43-n denote registers in which trace data 11 sent from the control unit 3 are written every time a write request is made, respectively, and reference numeral 44 denotes a decoder that decodes the output of the pointer 41 and outputs a write request signal to a register 43-i (i=1 to n) which is specified by the output of the pointer 41.

Figure 6:
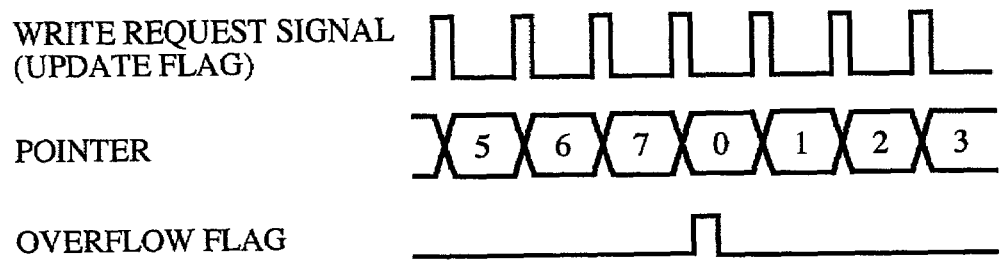
FIG. 6 is a timing chart showing processing which is performed when the DMA controller continues to write trace data in the trace buffer after the trace buffer of FIG. 5 has overflowed.
Figure 7:
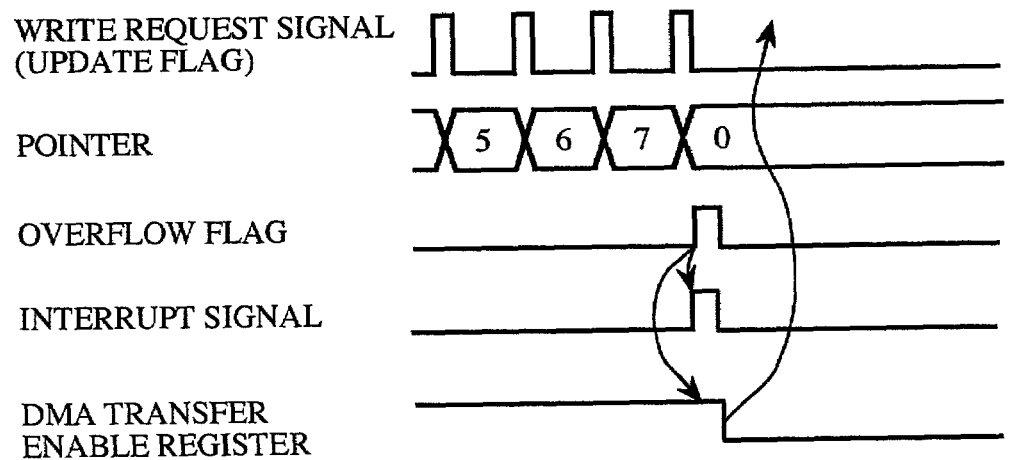
FIG. 7 is a timing chart shows processing which is performed when the DMA controller stops writing trace data in the trace buffer when the trace buffer of FIG. 5 overflows.

FIG. 6 is a timing chart showing a case where trace data 11 continues to be written into the trace buffer 4 after the trace buffer 4 has overflowed, and FIG. 7 is a timing chart showing a case where the writing of trace data 11 into the trace buffer 4 is stopped when the trace buffer 4 overflows.

The pointer 41 is a counter which specifies a register 43-i in which trace data 11 is to be written next, and increments its value by 1 from 0 every time it receives an update flag. The pointer 41 receives a write request signal 10 output from the control unit 3 shown in FIG. 1 to the trace buffer 4 as an update flag. The trace buffer 4 includes the plurality of registers 43-1 to 43-n into which trace data 11 is written in turn every time a write request is made. Therefore, when the trace buffer 4 includes 8 registers, the pointer 41 is a 3-bit counter, whereas, when the trace buffer 4 includes 16 registers, the pointer 41 is a 4-bit counter.

The decoder 44 decodes a value output from the pointer 41, and outputs a write request signal to one register 43-i (i=1 to n) which is specified by the output of the pointer 41. In response to the write request signal, the register 43-i stores the trace data 11 sent from the control unit 3 therein. The pointer 41 increments its value every time it receives a write request signal 10 from the control unit 3. When the value overflows, the pointer 41 sets the overflow flag 42 to 1 and sends the overflow flag 42 to the control unit 3, and then returns to 0 again. The DMA controller 5 includes a first mode in which when the pointer 41 of the trace buffer 4 overflows the DMA controller continues to write trace data 11 in the trace buffer 4, a second mode in which the DMA controller continues to carry out DMA transfers without stopping any DMA transfer while it stops writing of trace data 11 in the trace buffer 4, and a third mode in which the DMA controller stops writing of trace data 11 in the trace buffer 4 and also stops any DMA transfer. In the first mode, the pointer 41 is made to return to 0 again and trace data 11 is sequentially overwritten into the plurality of registers 43-1 to 43-n in which other trace data 11 has already been written, as shown in FIG. 6. In the second mode, when the overflow flag 42 is set, the trace buffer 4 controls itself so as not to write trace data 11 sent from the control unit 3 in the plurality of registers 43-1 to 43-n. For example, the overflow flag 42 is input to the decoder 44, and the decoder 44 is adapted not to output any write request signal to any register of the trace buffer 4 while the overflow flag 42 is set to 1. Therefore, no data is overwritten into the trace buffer 4 while DMA transfers are carried out continuously. In the third mode, the control unit 3 of the DMA controller 5 clears the contents of the DMA transfer enable register 27 (see FIG. 2) of each channel 2 to zero according to the overflow flag 42. When the DMA transfer enable bit is cleared to zero, the DMA controller 5 cannot start any subsequent DMA transfer for all the channels 2. Therefore, all DMA transfers are stopped and no data is overwritten in the trace buffer 4. When the overflow flag 42 is set, the control unit 3 of the DMA controller 5 notifies the functional module 7 that both trace and DMA transfers or only trace has been stopped by asserting an interruption signal.

Since the DMA controller 5 can stop writing of trace data when the trace buffer 4 overflows, it can prevent trace data which has already been written in the trace buffer from being deleted by overwriting. This results in an improvement in the debugging efficiency. Furthermore, since the DMA controller 5 can switch between the first and second modes, it is possible to specify a location where a trouble occurs by narrowing a range including the location while switching between these modes when debugging a program. The trace buffer 4 having the structure as shown in FIG. 5 is called ring buffer.

Figure 8:
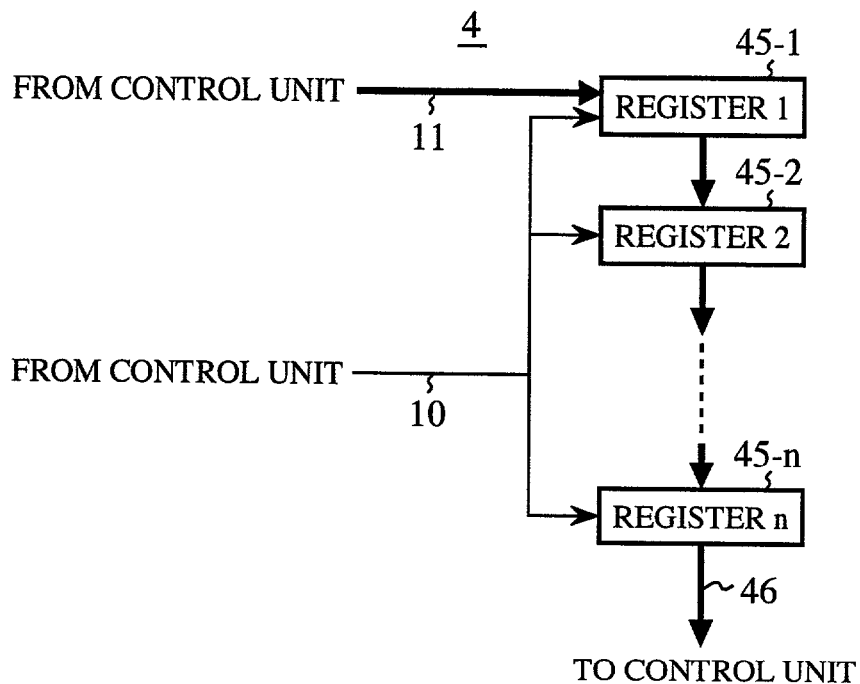
FIG. 8 is a block diagram showing the structure of another example of the trace buffer of the DMA controller according to the first embodiment of the present invention.

The structure of the trace buffer 4 is not limited to the one as shown in FIG. 5. FIG. 8 is a block diagram showing another example of the trace buffer 4. The trace buffer 4 as shown in FIG. 8 is an FIFO-type buffer. In the figure, reference numerals 45-1 to 45-n denote registers each of which, in response to a write request signal 10 from the control unit 3, transfers trace data which has already been stored therein to a next-stage register and then stores input trace data 11 therein, and reference numeral 46 denotes an overflow flag. The plurality of registers 45-1 to 45-n which constitute the trace buffer 4 have a structure similar that of a shift register, as shown in FIG. 8.

A write request signal 10 input to the trace buffer 4 from the control unit 3 is applied to each register of the FIFO-type trace buffer 4. Trace data 11 to be written is input to the first register 45-1 of the trace buffer 4 every time new writing is carried out, and the contents of each register 45-i (i=1 to n−1) is made to shift to the next-stage register 45-(i+1). If new writing is carried out when effective trace data is stored in the final-stage register 45-n, i.e., when the trace buffer 4 is filled to capacity, the trace buffer 4 sets the overflow flag 46 to 1. Like the case of the above-mentioned ring buffer as shown in FIG. 5, the DMA controller 5 includes, as processing modes in which itself is placed when the overflow flag 46 is set, a first mode in which the DMA controller continues to write trace data in the trace buffer 4, and a second mode in which the DMA controller stops writing of trace data in the trace buffer 4. In the first mode, the contents of each register 45-i (i=1 to n−1) are made to shift to the next-stage register 45-(i+1), and input trace data 11 is written into the first register 45-1 of the trace buffer 4. On the other hand, in the second mode, the control unit 3 of the DMA controller 5 clears the contents of the DMA transfer enable register 27 (see FIG. 2) of each channel 2 to zero according to the overflow flag 46. When the DMA transfer enable bit is cleared to zero, the DMA controller 5 cannot start any subsequent DMA transfer for all the channels 2. Therefore, no data is overwritten in the trace buffer 4. As an alternative, in the second mode, DMA transfers can continue to be carried out while only writing of trace data is stopped. For example, there can be provided a switch that can stop transmission of any write request signal 10 from the control unit 3 to each register while the overflow flag 46 is set to 1. When the overflow flag 46 is set, the control unit 3 of the DMA controller 5 notifies the functional module 7 that both trace and DMA transfers or only trace has been stopped by asserting an interruption signal.

Therefore, since the DMA controller 5 can stop writing of trace data into the trace buffer 4 when the trace buffer 4 overflows even in this case, trace data which has already been written in the trace buffer can be prevented from being deleted by overwriting. This results in an improvement in the debugging efficiency. Furthermore, since the DMA controller 5 can switch between the first and second modes, it is possible to specify a location where a trouble occurs by narrowing a range including the location while switching between these modes when debugging a program. In addition, since the trace buffer 4 has a structure like a shift register, no control of each register is needed and it is therefore to easily control the trace buffer 4, and the circuit scale can be reduced.

Preferably, the trace buffer 4 is mapped into a part of the address space of the functional module 7 such as a CPU. In this case, since the functional module 7 can read arbitrary trace data stored in the trace buffer 4, it can easily construct a debug system that can analyze trace data by using software, without having to provide a special apparatus.

Figure 9:
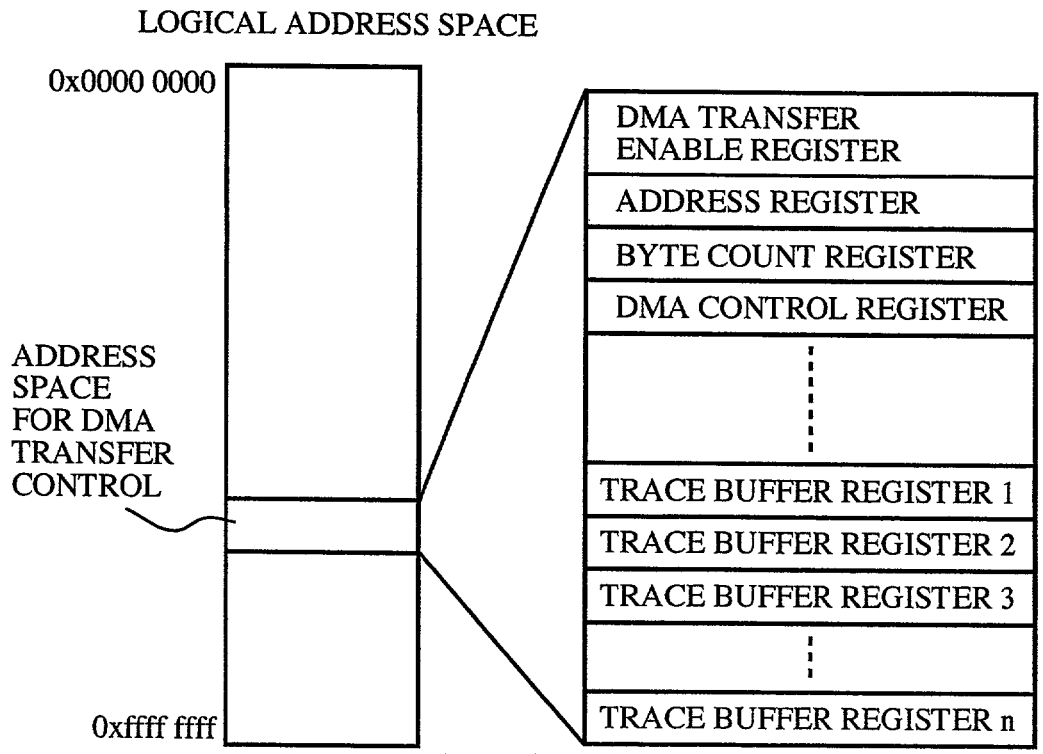
FIG. 9 is a diagram showing a logical address space of a functional module of the semiconductor integrated circuit equipped with the DMA controller according to the first embodiment of the present invention.

For example, when the functional module 7 is a 32-bit CPU, it has a logical address space with addresses from 0x00000000 to 0xffffffff in hex, as shown in FIG. 9. This logical address space contains an address space for DMA transfer control, into which the DMA transfer enable register 27, address register 24, byte count register 25, DMA control register 26 of each channel 2 and the plurality of registers included in the trace buffer 4 are mapped, as shown in FIG. 9.

Therefore, the functional module 7 can easily determine the settings of DMA transfer associated with each channel. Furthermore, the functional module 7 can read arbitrary trace data stored in the trace buffer 4 of the DMA controller 5 by way of the bus 8.

As mentioned above, in accordance with the first embodiment of the present invention, the DMA controller 5 is provided with the control unit 3 having the arbitration circuit 31 that arbitrates among a plurality of channels 2 so as to select one DMA request signal from a plurality of DMA request signals 1 accepted by way of the plurality of channels 2 according to priorities assigned to the plurality of channels 2 in advance, and the trace buffer 4 in which trace data 11 including at least a selected channel number 32 associated with the DMA request selected by the arbitration circuit 31, address data 34 on the addresses of a source of transfer and a destination of transfer associated with a channel specified by the selected channel number 32, transfer data number data 36, DMA request factor data 38, and one DMA request signal value set 40 is stored. Accordingly, the DMA controller makes it possible to easily determine if DMA transfers that are not to be intended have been activated, if the assignment of priorities to the plurality of channels 2 is appropriate, if wrong addressing has been done, and if DMA transfers have been carried out properly, and the DMA controller can facilitate the debugging of any program. Furthermore, in a semiconductor integrated circuit containing the DMA controller 5, when the trace buffer 4 is mapped into a part of the address space of the functional module 7, since the functional module 7 can read arbitrary trace data stored in the trace buffer 4, it can easily construct a debugging system that can analyze the trace data by using software, without having to provide a special apparatus.

In addition, in a system in which the priorities assigned to the plurality of channels 2 in advance are fixed and there exist requests which need a transfer rate of n1 bytes per second, requests which need a transfer rate of n2 bytes per second and a real-time performance, and requests which need a transfer rate of n3 bytes per second, but do not need a real-time performance, the DMA controller 5 according to the first embodiment of the present invention is effective in examining which DMA request factor is assigned to each channel in order to provide the best performance.

Embodiment 2.

Figure 10:
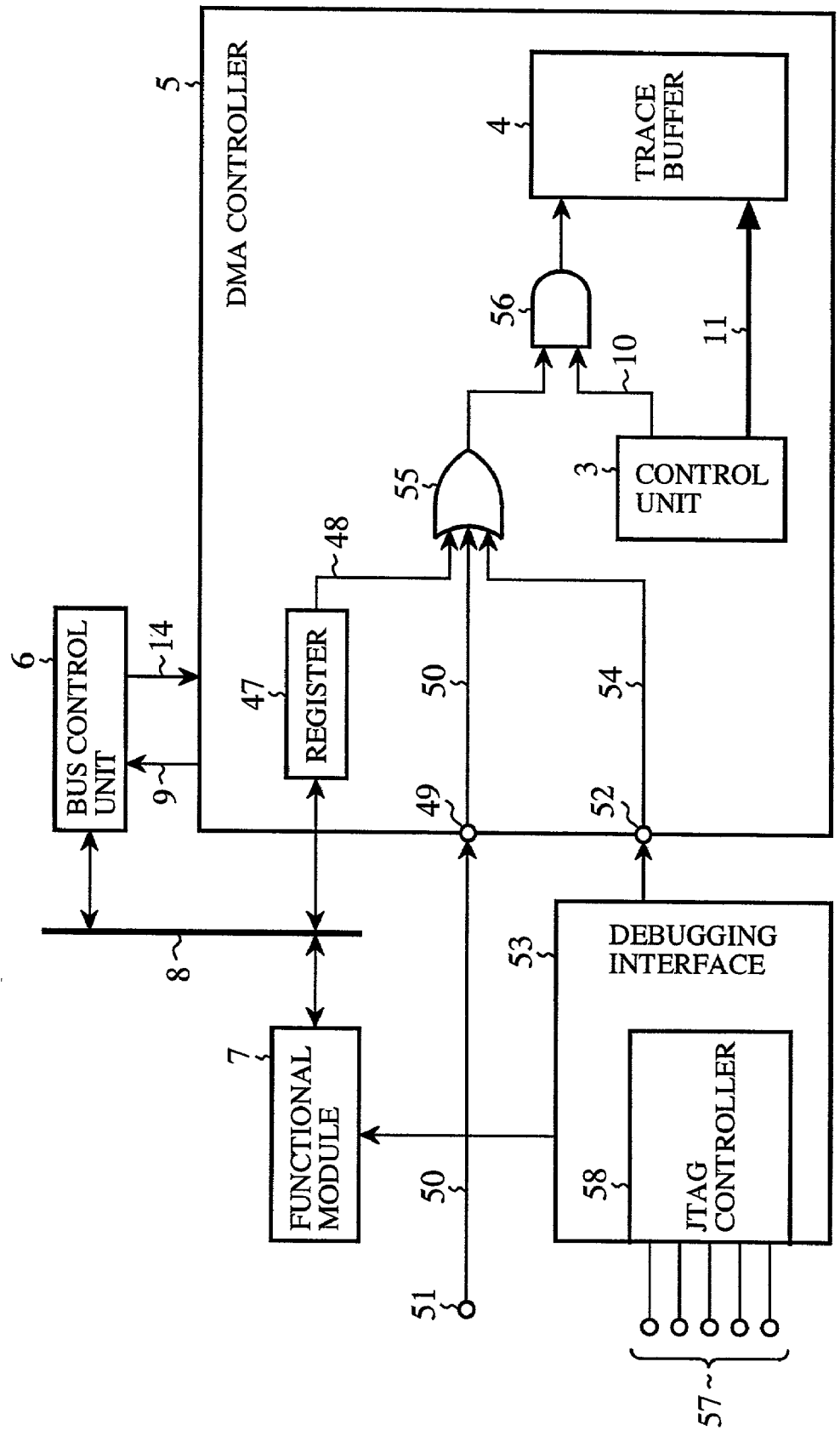
FIG. 10 is a block diagram showing the structure of a DMA controller according to a second embodiment of the present invention, and a semiconductor integrated circuit containing the DMA controller.

FIG. 10 is a block diagram showing the structure of a DMA controller according to a second embodiment of the present invention and a semiconductor integrated circuit containing the DMA controller. The DMA controller 5 according to the second embodiment has a write control function for enabling or disabling writing of trace data 11 in a trace buffer 4, in addition to the same structure as that of the DMA controller according to the above-mentioned first embodiment as shown in FIG. 1.

In FIG. 10, the same reference numerals as shown in FIG. 1 denote the same components as those of the DMA controller 5 according to the above-mentioned first embodiment, and therefore the explanation of those components will be omitted hereafter. In FIG. 10, reference numeral 47 denotes a register connected to a bus 8, in which the value of a first trace control signal 48 applied thereto by way of the bus 8 is written, for enabling or disabling writing of trace data in the trace buffer 4, reference numeral 49 denotes a first control terminal disposed on a chip of the semiconductor integrated circuit according to the second embodiment and connected to an external terminal 51 to which a second trace control signal 50 is applied from outside the semiconductor integrated circuit, reference numeral 52 is a second control terminal which is connected to a debugging interface circuit 53 included in the semiconductor integrated circuit and to which a third trace control signal 54 output from the debugging interface circuit 53 is applied, reference numeral 55 denotes an OR gate having three input terminals connected to an output terminal of the register 47 and the first and second control terminals 49 and 52, for implementing a logical OR operation on the three inputs, i.e., the first through trace control signals 48, 50, and 54, and reference numeral 56 denotes an AND gate for implementing a logical AND operation on an output of the OR gate 55 and a write request signal 10 output from a control unit 3. A plurality of channel 2 as shown in FIG. 1 are not shown in FIG. 10. Furthermore, a write control circuit of the DMA controller 5 is implemented by the register 47, the first and second control terminals 49 and 52, the OR gate 55, and the AND gate 56.

Furthermore, the debugging interface circuit 53 is provided with a JTAG controller 58 connected to JTAG terminals 57 (TCK, TMS, TDI, TDO, TRST), as shown in FIG. 10.

In operation, the register 47 is a register in which a value can be written by a functional module 7, such as a CPU, included in the semiconductor integrated circuit, and when 1 is written in the register 47, the register 47 outputs the first trace control signal 48 asserted to enable writing of trace data in the trace buffer 4 to the OR gate 55, whereas when 0 is written in the register 47, the register 47 outputs the first trace control signal 48 negated to disable writing of trace data in the trace buffer 4 to the OR gate 55. The contents of the register 47 can be rewritten with software. The DMA controller 5 receives the second trace control signal 50 applied to the external terminal 51 of the semiconductor integrated circuit chip into which the DMA controller 5 is incorporated by way of the first control terminal 49, and then sends the second trace control signal 50 to the OR gate 55.

The debugging interface circuit 53 is an on-chip debugging function module connected to the JTAG terminals 57, like an SDI (scalable debugging interface). The debugging interface circuit 53 is controlled by signals applied to the JTAG terminals 57 (TCK, TMS, TDI, TDO, TRST), and includes an accessing function of accessing the functional module 7 or the DMA controller 5 according to a command serially input thereto and a debugging function (break and trace, etc.). For example, when the debugging interface circuit 53 receives a command for writing 1 in the register 47 by way of the JTAG terminals 57 and the JTAG controller 58, the debugging interface circuit 53 can direct the functional module 7 to write 1 in the register 47 by way of the bus 8. On the other hand, when the debugging interface circuit 53 receives a command for enabling writing of trace data in the trace buffer 4 directly by way of the JTAG terminals 57 and the JTAG controller 58, the debugging interface circuit 53 asserts the internal signal, i.e., the third trace control signal 54 and then sends it to the second control terminal 52 of the DMA controller 5. Then the third trace control signal 54 is input to the OR gate 55.

As mentioned above, the DMA controller 5 according to the second embodiment of the present invention has three methods of enabling or disabling writing of trace data 11 in the trace buffer 4, and performs writing control of the trace buffer 4 by implementing either one of the three methods.

The OR gate 55 implements the logical OR operation on the first through third trace control signals 48, 50, and 54 and outputs an OR operation result to the AND gate 56. The AND gate 56 implements the logical AND operation on the output of the OR gate 55 and the write request signal 10 output from the control unit 3 and outputs an AND operation result to the trace buffer 4.

On the other hand, the control unit 3 of the DMA controller 5 according to-the second embodiment arbitrates among the plurality of channels 2 for DMA requests and selects one channel, like that of the above-mentioned first embodiment. Then the control unit 3 outputs a control signal 9 for directing the DMA controller to start a DMA transfer to the bus control unit 6 of FIG. 1. When the DMA controller 5 receives a DMA transfer enable signal 14 from the bus control unit 6, the DMA controller 5 starts a DNA transfer according to the settings of the selected channel 2. In addition, the control unit 3 outputs trace data 11 including at least a selected channel number, address data on the addresses of a source of transfer and a destination of transfer associated with a channel specified by the selected channel number, transfer data number data, DMA request factor data, and one DMA request signal value set to the trace buffer 4. The trace buffer 4 writes the received trace data 11 therein when the AND operation result, which is output from the AND gate 56 as mentioned above, is 1.

As mentioned above, in accordance with the second embodiment of the present invention, since the control unit 3 of the DMA controller 5 enables or disables writing of trace data 11 in the trace buffer 4, the trace data being associated with a DMA request from a channel selected by the arbitration circuit of the control unit 3, according to the first trace control signal 48 output from the register 47, the second trace control signal 50 input from outside the DMA controller 5 by way of the first control terminal 49, and the third trace control signal 54 applied thereto from the debugging interface circuit 53, the DMA controller 5 can switch between the write enable mode in which it can write trace data in the trace buffer 4 and the write disable mode in which it cannot write trace data in the trace buffer 4 while the DMA controller 5 is working, and the DMA controller 5 makes it possible to extract trace data associated with one or more DMA transfers which were carried out within a certain period of time. This results in a further improvement in the debugging efficiency. Furthermore, by controlling the DMA controller 5 so that it enables writing of trace data in the trace buffer 4 while debugging a program, whereas it disables writing of trace data in the trace buffer 4 while the DMA controller 5 operates under normal conditions, the power consumption due to the writing of trace data 11 in the trace buffer 4 can be reduced.

Embodiment 3.

Figure 11:
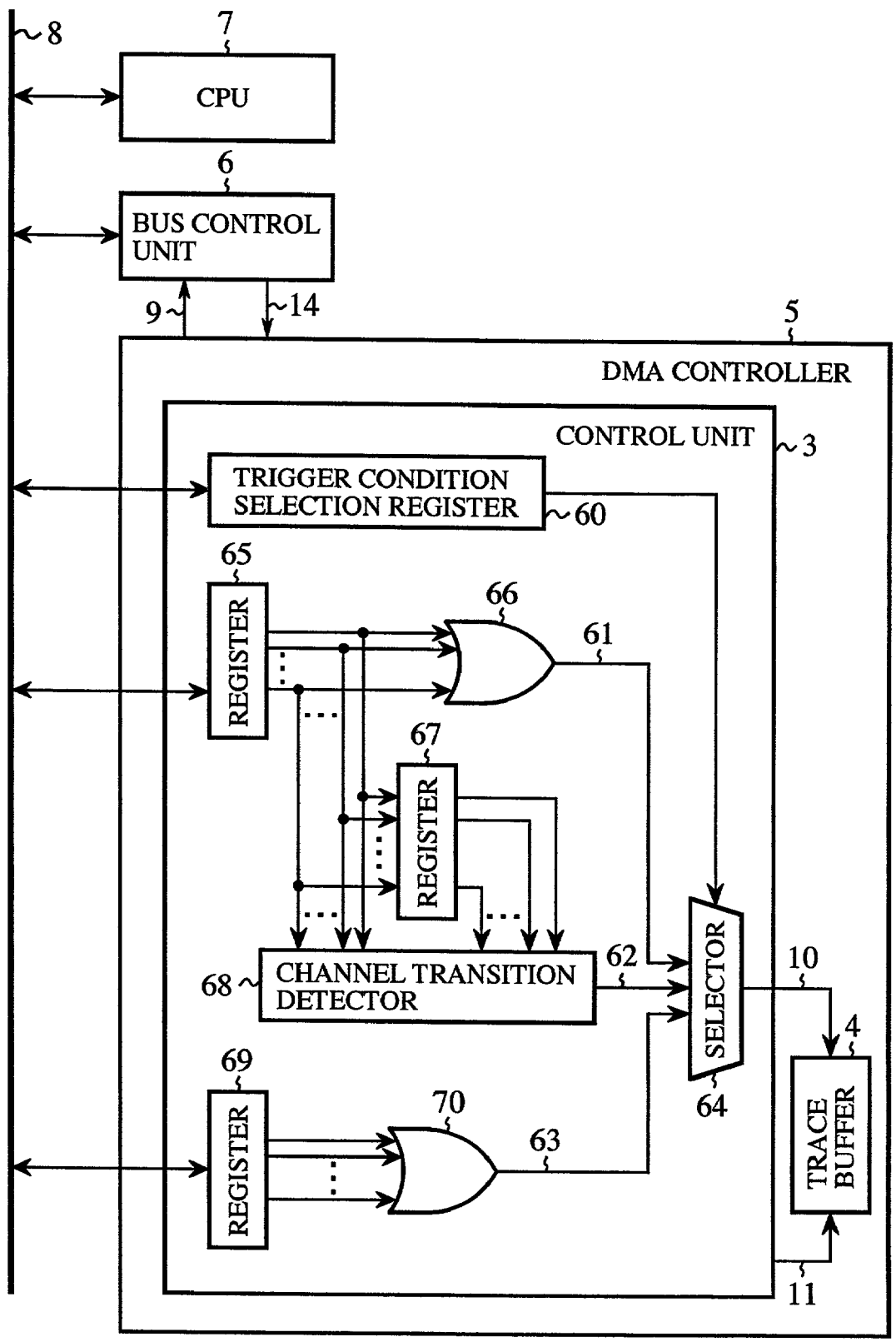
FIG. 11 is a block diagram showing the structure of a DMA controller according to a third embodiment of the present invention, and a semiconductor integrated circuit containing the DMA controller.

FIG. 11 is a block diagram showing the structure of a DMA controller according to a third embodiment of the present invention and a semiconductor integrated circuit containing the DMA controller. The DMA controller 5 according to the third embodiment of the present invention has a function of setting trigger conditions each for triggering writing of trace data in a trace buffer 4 and selecting one of the trigger conditions, in addition to the structure of that according to the above-mentioned first embodiment as shown in FIG. 1.

In FIG. 11, the same reference numerals as shown in FIG. 1 denote the same components as those of the DMZA controller 5 according to the above-mentioned first embodiment, and therefore the explanation of those components will be omitted hereafter. In FIG. 11, reference numeral 60 denotes a trigger condition selection register in which a value to select one trigger condition from among a plurality of trigger conditions is stored, for outputting a trigger condition selection signal corresponding to the value, reference numeral 64 denotes a selector that receives a first trigger condition signal 61 indicating a start of a one-operand transfer, a second trigger condition signal 62 indicating a transition between channels, a third trigger condition signal 63 indicating that a byte count, i.e., the number of data to be transferred becomes 0, and that selects one of the first through third trigger condition signals 61 to 63 according to the trigger condition selection signal from the trigger condition selection register 60 and outputs the selected trigger condition signal to the trace buffer 4 as a write request signal 10, and reference numeral 65 denotes a register which consists of a plurality of bits whose number corresponds to the number of channels, each bit indicating an arbitration status flag of a corresponding channel. When one operand is transferred via a certain channel, a bit of the register 65 which corresponds to the channel is set to 1 and all other bits are set to 0. Furthermore, reference numeral 66 denotes an OR gate for implementing a logical OR operation on the values of the plurality of bits of the register 65 and for outputting an OR operation result to the selector 64 as the first trigger condition signal 61, reference numeral 67 denotes a register for temporarily holding the values of the plurality of bits of the register 65, reference numeral 68 denotes a channel transition detector for comparing the values of the plurality of bits held by the register 67 with the values of a plurality of bits output from the register 65 which indicate the present arbitration statuses of the plurality of channels, respectively, for determining whether a channel transition has occurred, i.e., whether a channel via which a DMA transfer is to be carried out differs from the channel via which the previous DMA transfer was carried out, and for outputting a determination result to the selector 64 as the second trigger condition signal 62, reference numeral 69 denotes a register used for detecting the completion of a DMA transfer via each channel, which consists of a plurality of bits whose number corresponds to the number of channels and each of which indicates whether a byte count, i.e., the number of data to be transferred associated with the DMA transfer via a corresponding channel is 0, and reference numeral 70 denotes an OR gate for implementing a logical OR operation on the values of the plurality of bits of the register 69 and for outputting an OR operation result to the selector 64 as the third trigger condition signal 63. The plurality of channels 2 as shown in FIG. 1 are not shown in FIG. 11. Furthermore, a trigger circuit of the DMA controller 5 is implemented by the trigger condition selection register 60, the selector 64, the register 65, the OR gate 66, the register 67, the channel transition detector 68, the register 69, and the OR gate 70.

The trigger condition selection register 60 is a register in which data can be written by a functional module 7 of FIG. 1, and includes a field to select a trigger condition which triggers trace. The control unit 3 of the DMA controller 5 selects the trigger condition that triggers trace according to the value of the trigger condition selection register 60 and writes trace data 11 in the trace buffer 4. If the value of the trigger condition selection register 60 is 0, the control unit 3 executes a trace every time a one-operand transfer is carried out. If the value of the trigger condition selection register 60 is 1, the control unit 3 executes a trace when a channel transition is performed. If the value of the trigger condition selection register 60 is 2, the control unit 3 executes a trace when the completion of the DMA transfer is detected. The contents of the trigger condition selection register 60 can be rewritten with software.

The arbitration status flag exists for each channel, and indicates the stat us of a one-operand transfer via each channel. When a one-operand transfer via a channel is started, the control unit 3 sets a corresponding bit of the register 65, i.e., one arbitration status flag which corresponds to the channel to 1, and clears all other bits corresponding to all other channels to 0. When the one-operand transfer is completed, the control unit 3 clears the bit to 0. The OR gate 66 implements the logical OR operation on the values of the plurality of bits of the register 65, i.e., the arbitration status flags of the plurality of channels, and then outputs an OR operation result to the selector 64 as the first trigger condition signal 61. Therefore, when a one-operand transfer is started via any one of the plurality of channels, the OR gate 66 outputs the first trigger condition signal 61 in a High state to the selector 64. When the selected trigger condition is the one that triggers trace every time a one-operand transfer is carried out, the selector 64 generates a write request signal 10 in response to a rising edge of the first trigger condition signal 61 and outputs it to the trace buffer 4.

Figure 12:
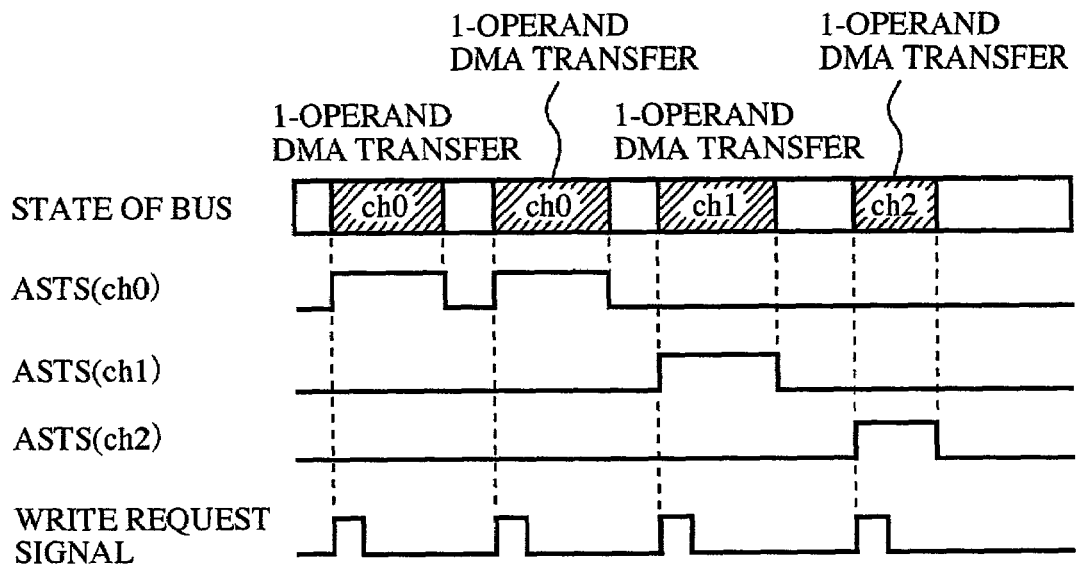
FIG. 12 is a timing chart showing arbitration status flags and a write request signal in an example of DMA transfers which are carried out when a trigger condition that triggers writing of trace data in a trace buffer is a one-operand transfer in the DMA controller according to the third embodiment of the present invention.
Figure 13:
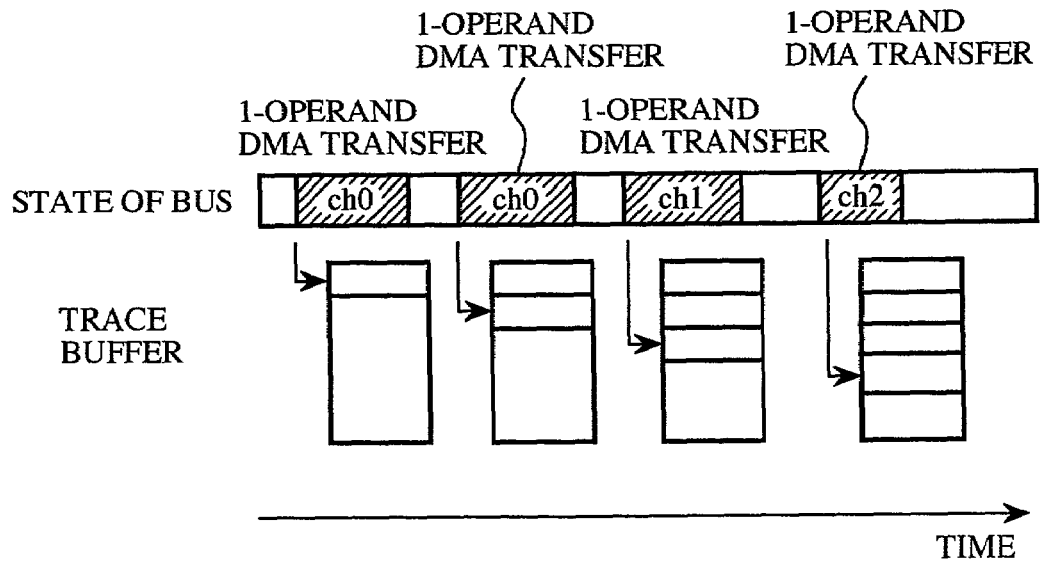
FIG. 13 is a timing chart showing the state of the trace buffer in the case of FIG. 12.

FIG. 12 is a timing chart showing the arbitration status flags and the write request signal 10 in an example of DMA transfers which are carried out when the selected trigger condition that triggers writing of trace data in the trace buffer 4 is the one that triggers trace every time a one-operand transfer is carried out. In the figure, ASTS denotes the arbitration status flag of each channel. Furthermore, FIG. 13 is a timing chart showing the state of the trace buffer 4 in the case of FIG. 12. As shown in FIGS. 12 and 13, every time a one-operand transfer via any one of the plurality of channels is started (i.e., every time any one of the plurality of arbitration status flags is set to 1), the control unit 3 generates the first trigger condition signal 61 and also generates the write request signal 10 based on the first trigger condition signal 61, and outputs the write request signal 10 to the trace buffer 4. The control unit 3 then writes trace data 11 associated with the channel via which the next DMA transfer is to be carried out in the trace buffer 4.

By comparing the contents of the register 65 with the contents of the register 67, the channel transition detector 68 can determine whether the channel via which a DMA transfer is to be carried out differs from a channel via which the previous DMA transfer was carried out. In other words, the channel transition detector 68 stores the arbitration status flags of the plurality of channels every time a one-operand transfer is started, and compares them with the previous arbitration status flags for the previous one-operand transfer, which are held by the register 67, respectively. When the channel transition detector 68 detects a channel transition, it outputs the second trigger condition signal 62 in a High state to the selector 64. When the selected trigger condition is the one that triggers trace when a channel transition is done, the selector 64 generates a write request signal 10 in response to a rising edge of the second trigger condition signal 62 and outputs the write request signal 10 to the trace buffer 4.

Figure 14:
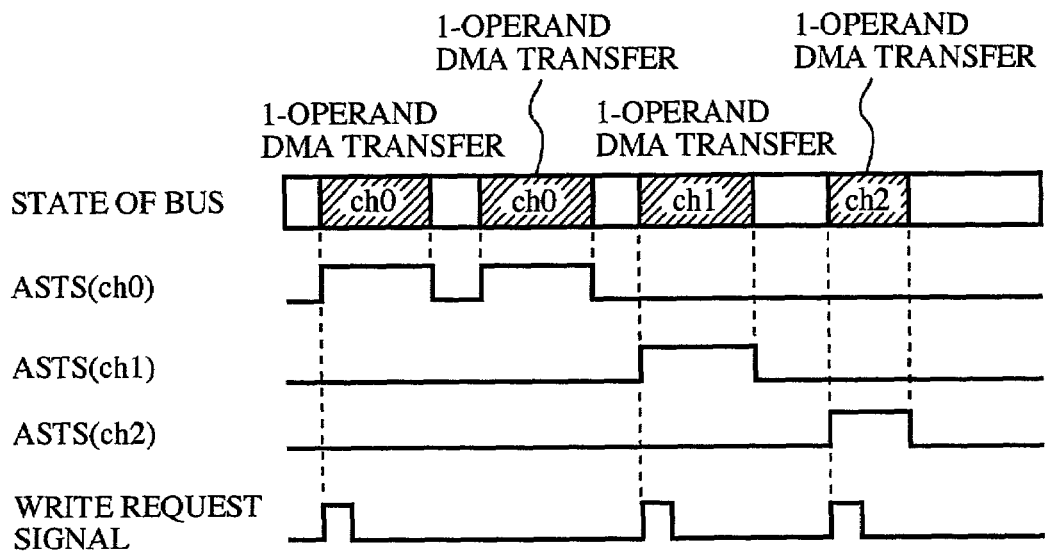
FIG. 14 is a timing chart showing arbitration status flags and a write request signal in an example of DMA transfers which are carried out when the trigger condition is a channel transition in the DMA controller according to the third embodiment of the present invention.
Figure 15:
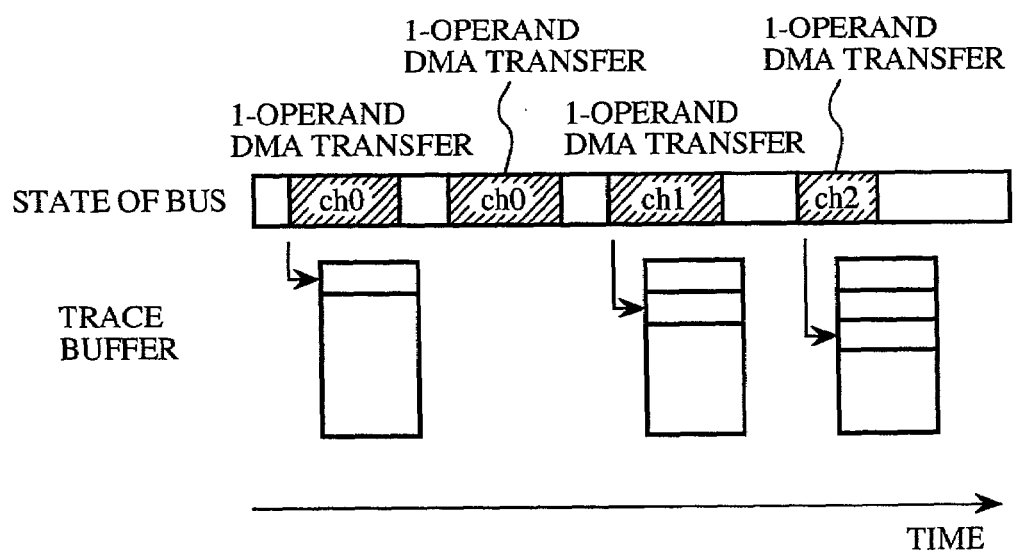
FIG. 15 is a timing chart showing the state of the trace buffer in the case of FIG. 14.

FIG. 14 is a timing chart showing the arbitration status flags and the write request signal 10 in an example of DMA transfers which are carried out when the trigger condition to trigger writing of trace data in the trace buffer 4 is the one that triggers trace when a channel transition is done. Furthermore, FIG. 15 is a timing chart showing the state of the trace buffer 4 in the case of FIG. 14. As shown in FIGS. 14 and 15, every time a one-operand transfer via a channel which differs from the channel associated with the previous DMA transfer is started (i.e., every time an arbitration status flag which differs from the arbitration status flag associated with the previous DMA transfer is set to 1), the control unit 3 generates the second trigger condition signal 62 and also generates the write request signal 10 based on the second trigger condition signal 62, and outputs the write request signal 10 to the trace buffer 4. The control unit 3 then writes trace data 11 associated with the channel via which the next DMA transfer is to be carried out in the trace buffer 4. Therefore, as shown in FIGS. 14 and 15, when a DMA transfer via channel 0 is carried out two times continuously, no trace data is written in the trace buffer 4 for the second-time DMA transfer.

A transfer completion detection flag exists for each channel and indicates whether or not a DMA transfer via each channel has been completed. When a one-operand transfer via a channel is completed and the byte count, i.e., the number of data to be transferred for the channel becomes 0, the control unit 3 sets a bit of the register 69 which corresponds to the channel, i.e., the transfer completion detection flag of the channel to 1, and clears all other bits for all other channels to 0. The OR gate 70 implements the logical OR operation on the plurality of bits of the register 69, i.e., the transfer completion detection flags of the plurality of channels, and then outputs an OR operation result to the selector 64 as the third trigger condition signal 63. Therefore, when a one-operand transfer via any one of the plurality of channels is completed and the byte count for the channel becomes 0, the OR gate 70 outputs the third trigger condition signal 63 in a High state to the selector 64. When the selected trigger condition is the one that triggers trace when the completion of a DMA transfer is detected, the selector 64 generates a write request signal 10 in response to arising edge of the third trigger condition signal 63 and outputs the write request signal 10 to the trace buffer 4.

Figure 16:
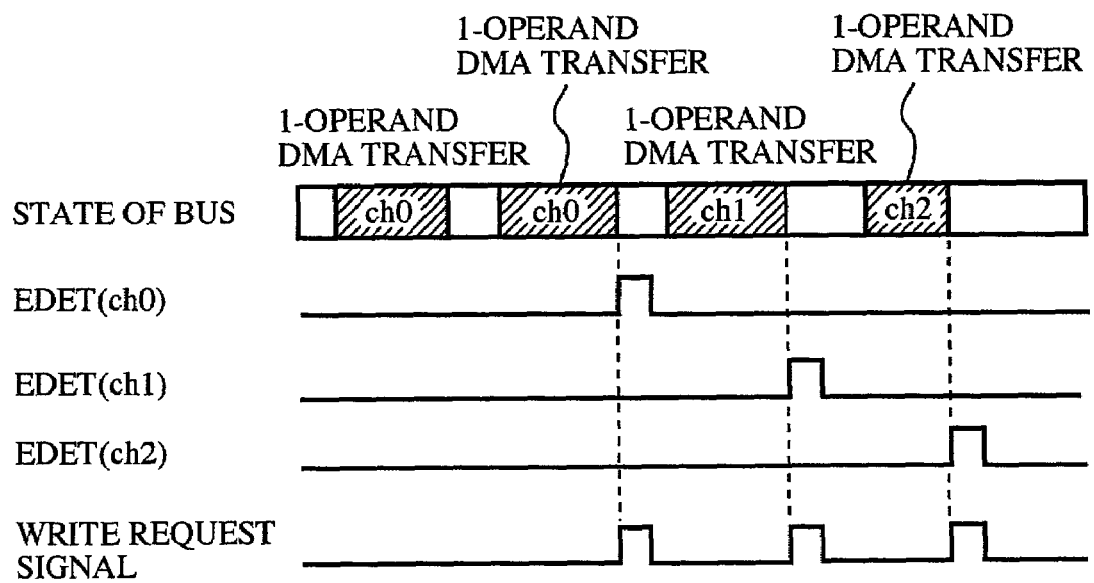
FIG. 16 is a timing chart showing transfer completion detection flags and a write request signal in an example of DMA transfers which are carried out when the trigger condition is a transfer completion detection in the DMA controller according to the third embodiment of the present invention.
Figure 17:
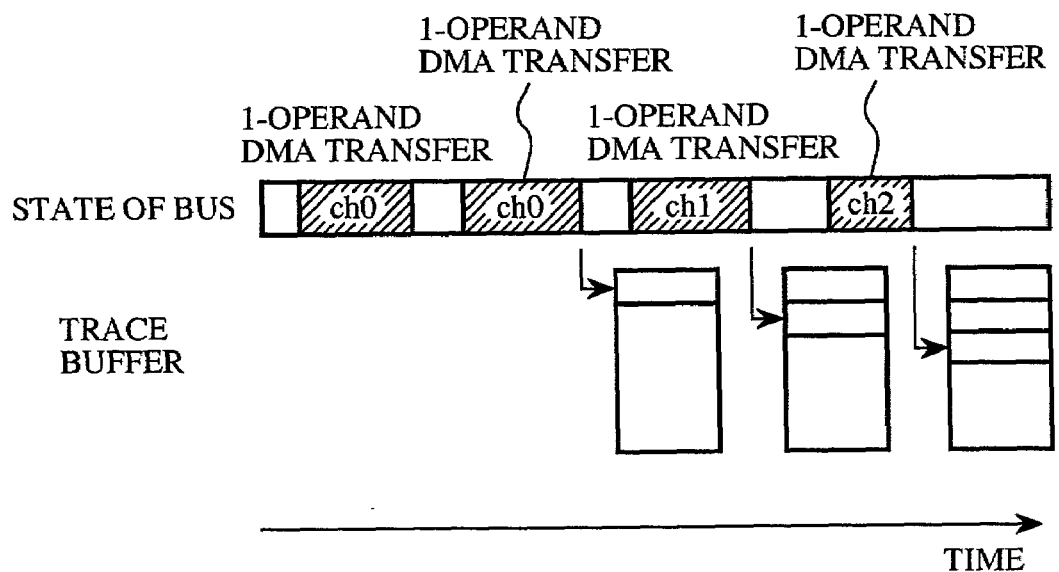
FIG. 17 is a timing chart showing the state of the trace buffer in the case of FIG. 16.

FIG. 16 is a timing chart showing the transfer completion detection flags and the write request signal 10 in an example of DMA transfers which are carried out when the trigger condition to trigger writing of trace data in the trace buffer 4 is the one that triggers trace when the completion of a DMA transfer is detected. In the figure, EDET denotes a transfer completion detection flag for each channel. Furthermore, FIG. 17 is a timing chart showing the state of the trace buffer 4 in the case of FIG. 16. As shown in FIGS. 16 and 17, every time a one-operand transfer via any one of the plurality of channels is completed and the byte count, i.e., the number of data to be transferred associated with the channel becomes 0 (i.e., every time any one of the plurality of transfer completion detection flags is set to 1), the control unit 3 generates the third trigger condition .signal 63 and also generates the write request signal 10 based on the third trigger condition signal 63, and outputs the write request signal 10 to the trace buffer 4.

The control unit 3 thus generates the first through third trigger condition signals (indicating detection of a one-operand transfer, detection of a channel transition, and detection of the completion of a transfer) which becomes a trigger for triggering a trace, and selects one trigger condition signal from among them by using the selector 64 and outputs the selected trigger condition signal to the trace buffer 4 as a write request signal 10.

As mentioned above, in accordance with the third embodiment of the present invention, since the DMA controller can select one trigger condition from the plurality of trigger conditions and can write trace data 11 required for debugging in the trace buffer 4 when the selected trigger condition is satisfied, the DMA controller can classify the trace data according to the trigger conditions and therefore can easily extract trace data required for debugging, thus further improving the debugging efficiency.

Embodiment 4.

Figure 18:
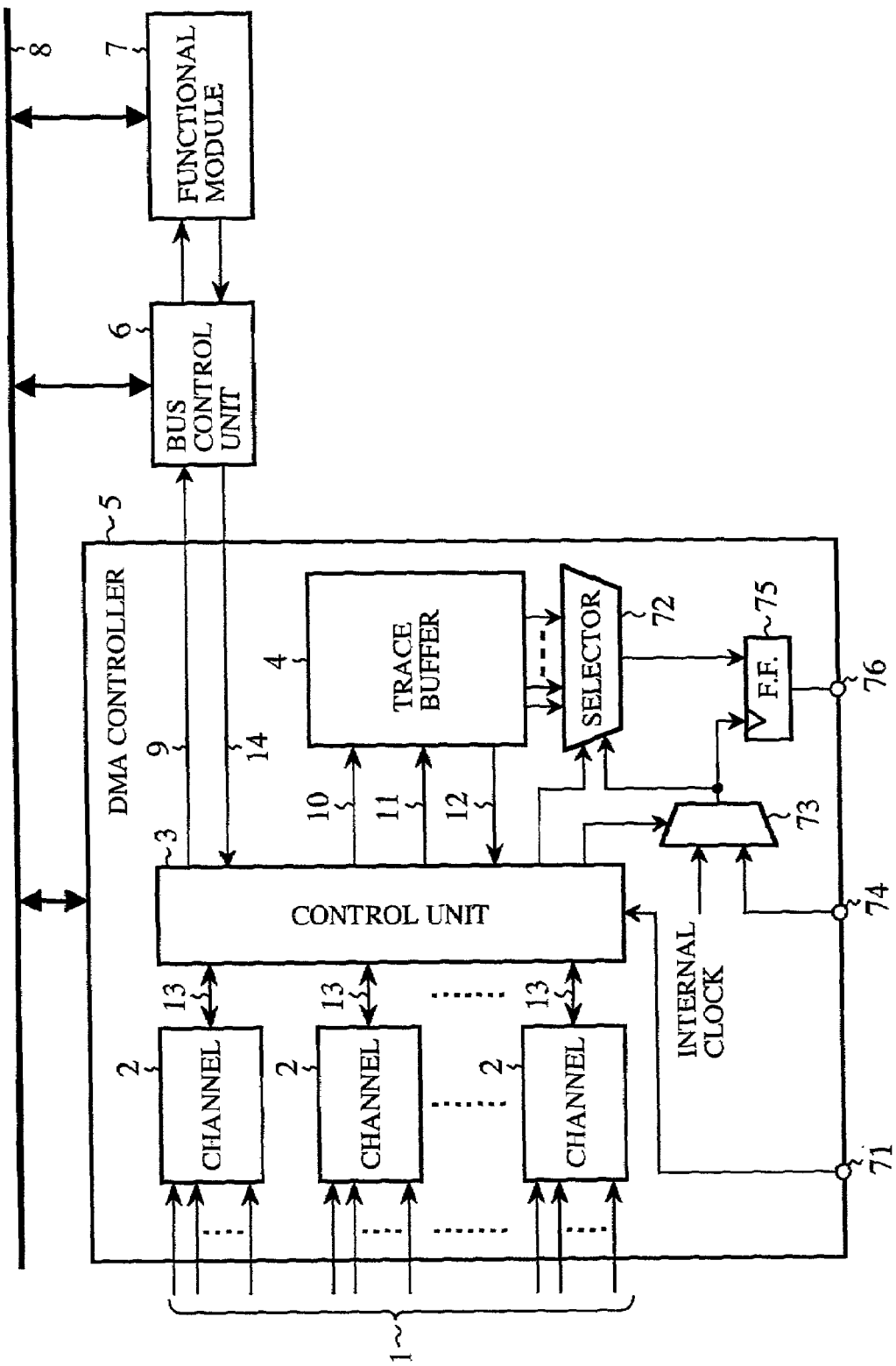
FIG. 18 is a block diagram showing the structure of a DMA controller according to a fourth embodiment of the present invention, and a semiconductor integrated circuit containing the DMA controller.

FIG. 18 is a block diagram showing the structure of a DMA controller according to a fourth embodiment of the present invention and a semiconductor integrated circuit containing the DMA controller. The DMA controller 5 according to the fourth embodiment of the present invention has a function of reading trace data from a trace buffer 4 of the DMA controller 5, in a addition to the structure of that according to the above-mentioned first embodiment as shown in FIG. 1.

In FIG. 18, the same reference numerals as shown in FIG. 1 denote the same components as those of the DMA controller 5 according to the above-mentioned first embodiment, and therefore the explanation of those components will be omitted hereafter. In FIG. 18, reference numeral 71 denotes a control terminal for receiving a read request signal indicating a request for reading of trace data, which is applied thereto from outside the DMA controller, reference numeral 72 denotes a selector for selecting and reading trace data one by one from the trace buffer 4 in response to a control signal which a control unit 3 outputs in response to the received read request signal, reference numeral 73 denotes a selector for selecting either an internal clock or an external clock applied thereto by way of an external clock input terminal 74 according to a clock selection signal output from the control unit 3, and for outputting the selected clock, and reference numeral 75 denotes a flip-flop for holding the trace data output from the selector 72, and for outputting the trace data to a trace data output terminal 76 in response to the clock output from the selector 73. A read circuit of the DMA controller 5 is implemented by the control terminal 71, the selectors 72 and 73, the external clock input terminal 74, the flip-flop 75, and the trace data output terminal 76.

In operation, the control unit 3 of the DMA controller 5 can write trace data 11 in the trace buffer 4 every time a DMA transfer is carried out, like that of the above-mentioned first embodiment.

In order to read trace data stored in the trace buffer 4 from the DMA controller 5 in synchronization with the external clock, a read request signal which specifies reading with an external clock is applied to the control terminal 71 and an external clock is applied to the external clock input terminal 74. In response to the received read request signal the control unit 3 outputs a control signal which directs reading of data from the trace buffer to the selector 72, and outputs a clock selection signal which directs the selection of the external clock to the selector 73. The selector 72 selects and reads trace data from the head of the trace buffer 4 one by one and outputs them to the flip-flop 75 in response to the control signal from the control unit 3. On the other hand, the selector 73 selects the external clock applied thereto by way of the external clock input terminal 74 and outputs the external clock to a clock terminal of the flip-flop 75. The flip-flop 75 holds the trace data which have been output from the selector 72 one by one, and then outputs the trace data held therein to the trace data output terminal 76 in synchronization with the external clock.

On the other hand, in order to read the trace data stored in the trace buffer 4 from the DMA controller 5 in synchronization with the internal clock, a read request signal which specifies reading with the internal clock is applied to the control terminal 71. In response to the received read request signal the control unit 3 outputs a control signal which directs reading of data from the trace buffer to the selector 72, and outputs a clock selection signal which directs the selection of the internal clock to the selector 73. The selector 72 selects and reads trace data from the head of the trace buffer 4 one by one and outputs them to the flip-flop 75 in response to the control signal from the control unit 3. On the other hand, the selector 73 selects the internal clock and outputs it to the clock terminal of the flip-flop 75. The flip-flop 75 holds the trace data which have been output from the selector 72 one by one, and then outputs the trace data held therein to the trace data output terminal 76 in synchronization with the internal clock.

As mentioned above, in accordance with the fourth embodiment of the present invention, since the DMA controller makes it possible to read trace data from the DMA controller 5 in synchronization with either an external clock applied thereto or the internal clock, the DMA controller can prevent trace from being stopped when the trace buffer 4 overflows and therefore can output the trace data to outside the DMA controller in real time so as to provide the trace data for the user, thereby improving the debugging efficiency.

Embodiment 5.

Figure 19:
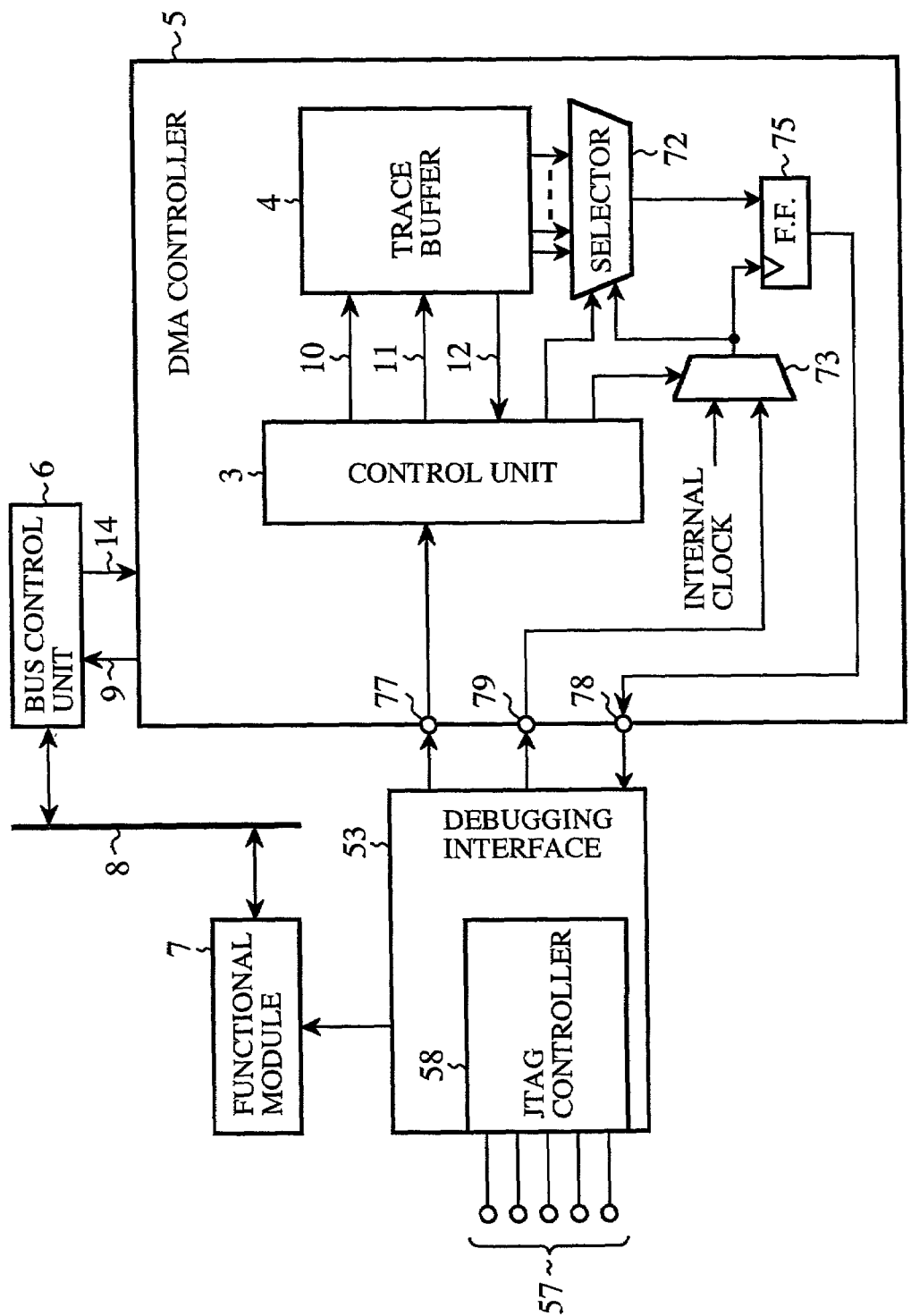
FIG. 19 is a block diagram showing the structure of a DMA controller according to a fifth embodiment of the present invention, and a semiconductor integrated circuit containing the DNA controller.
Figure 20:
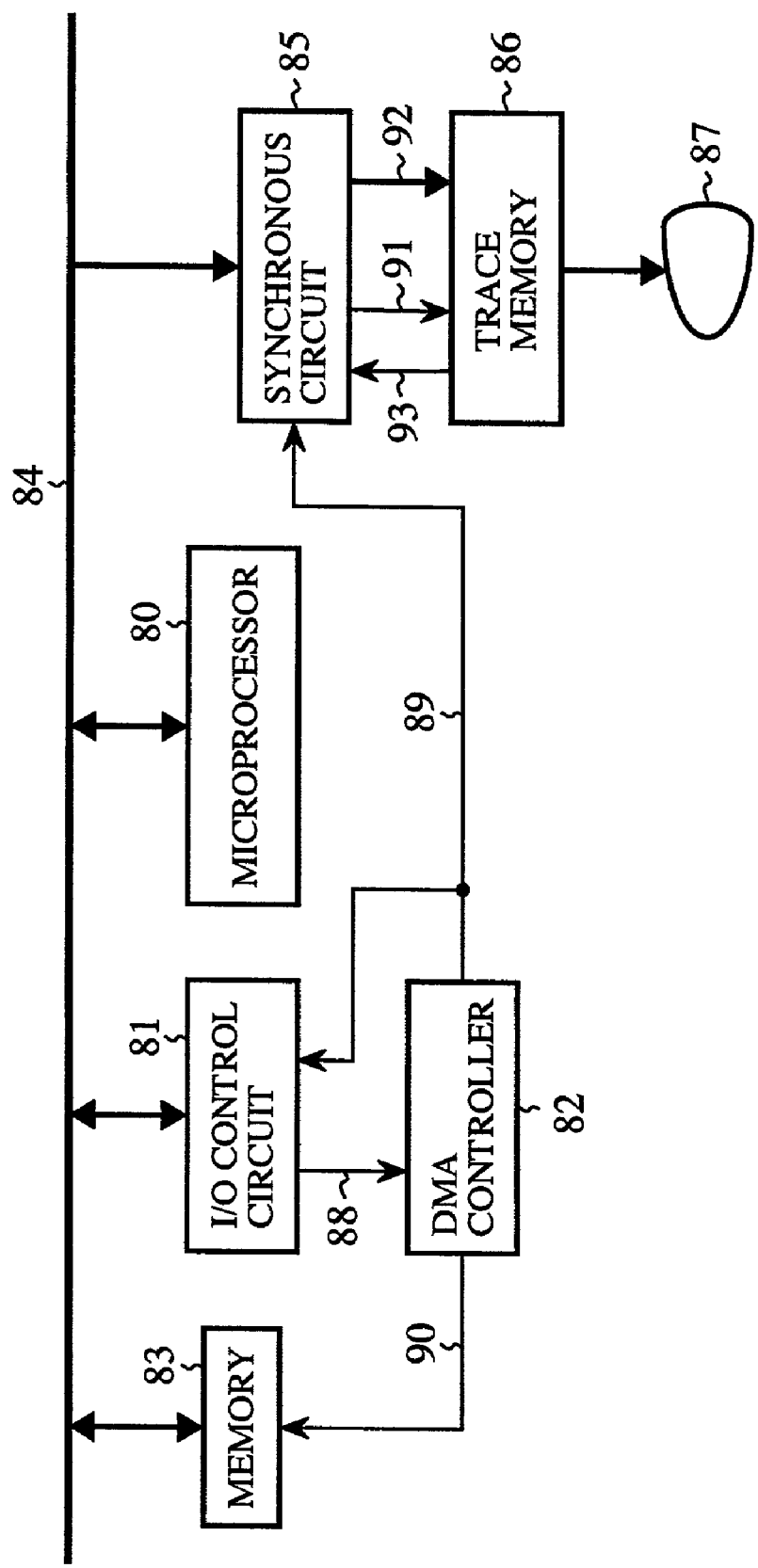
FIG. 20 is a block diagram showing the structure of terminal equipment and a data collector which implement an example of a prior art trace method.

FIG. 19 is a block diagram showing the structure of a DMA controller according to a fifth embodiment of the present invention and a semiconductor integrated circuit containing the DMA controller. The DMA controller 5 according to the fifth embodiment of the present invention has a function of reading trace data from a trace buffer 4 of the DMA controller 5 by way of a debugging interface circuit 53, in addition to the structure of that according to the above-mentioned first embodiment as shown in FIG. 1.

In FIG. 19, the same reference numerals as shown in FIGS. 1 and 18 denote the same components as those of the DMA controller 5 according to either of the above-mentioned first and fourth embodiment, and therefore the explanation of those components will be omitted hereafter. In FIG. 19, reference numeral 77 denotes a control terminal for receiving a read request signal indicating a request for reading of trace data, which is applied thereto from the debugging interface circuit 53, reference numeral 78 denotes a trace data output terminal via which trace data output from a flip-flop 75 is sent to the debugging interface circuit 53, and reference numeral 79 denotes an external clock input terminal for receiving an external clock applied thereto from the debugging interface circuit 53. A plurality of channels 2 are not shown in FIG. 19. Furthermore, a read circuit of the DMA controller 5 is implemented by selectors 72 and 73, the flip-flop 75, the control terminal 77, the trace data output terminal 78, and the external clock input terminal 79.

In operation, a control unit 3 of the DMA controller 5 can write trace data 11 in the trace buffer 4 every time a DMA transfer is carried out, like that of the above-mentioned first embodiment.

As previously mentioned, the debugging interface circuit 53 is an on-chip debugging functional module connected to JTAG terminals 57, like an SDI (scalable debugging interface). The debug interface circuit 53 is controlled by signals applied to the JTAG terminals 57 (TCK, TMS, TDI, TDO, TRST), and includes an accessing function of accessing a functional module 7 or the DMA controller 5 according to a command serially input thereto and a debugging function (break and trace, etc.).

In addition, the debugging interface circuit 53 according to the fifth embodiment of the present invention includes a command for reading trace data from the trace buffer 4. When, the debugging interface circuit 53 receives this command byway of the JTAG terminals 57 and the JTAG controller 58, the debugging interface circuit 53 outputs a read request signal indicating a request for reading of trace data to the control terminal 77 the DMA controller 5, not by way of the functional module 7.

In order to read trace data stored in the trace buffer 4 of the DMA controller 5 from the DMA controller 5 in synchronization with an external clock, the debugging interface circuit 53 applies a read request signal which specifies a request for reading with the external clock to the control terminal 77 and also applies the external clock to the external clock input terminal 79. After that, the control unit 3 reads and outputs the trace data from the trace buffer 4 one by one to the trace data output terminal 78 in synchronization with the external clock, like that of the above-mentioned fourth embodiment. Then the debugging interface circuit 53 outputs the trace data received by way of the trace data output terminal 78 to outside the DMA controller one by one by way of the JTAG terminals 57.

On the other hand, in order to read trace data stored in the trace buffer 4 of the DMA controller 5 from the DMA controller 5 in synchronization with an internal clock, the debugging interface circuit 53 applies a read request signal which specifies a request for reading with the internal clock to the control terminal 77. After that, the control unit 3 reads and outputs the trace data from the trace buffer 4 one by one to the trace data output terminal 78 in synchronization with the internal clock, like that of the above-mentioned fourth embodiment. Then the debugging interface circuit 53 outputs the trace data received by way of the trace data output terminal 78 to outside the DMA controller one by one by way of the JTAG terminals 57.

As mentioned above, in accordance with the fifth embodiment of the present invention, since the DMA controller makes it possible to read trace data from the DMA controller 5 by way of the debugging interface circuit 53 in synchronization with an external clock applied thereto or the internal clock, the DMA controller can prevent trace from being stopped when the trace buffer 4 overflows and therefore can output the trace data to outside the DMA controller in real time so as to provide the trace data for the user, thereby improving the debugging efficiency.

Many widely different embodiments of the present invention may be constructed without departing from the spirit and scope of the present invention. It should be understood that the present invention is not limited to the specific embodiments described in the specification, except as defined in the appended claims.

What is claimed is:

1. A DMA controller comprising:
    an arbitration circuit for arbitrating among a plurality of channels so as to select a DMA request from among a plurality of DMA requests accepted by way of the plurality of channels according to priorities assigned to the plurality of channels in advance; and
    a trace buffer for storing only trace data associated with the DMA request selected by said arbitration circuit, said trace data including channel numbers, transfer addresses of channels and request factor data.

2. The DMA controller according to claim 1, further comprising a write control circuit for enabling or disabling writing of the trace data associated with the DMA request selected by said arbitration circuit in said trace buffer.

3. The DMA controller according to claim 2, wherein said write control circuit includes a register for controlling writing of trace data in said trace buffer and said write control circuit enables or disables the writing of the trace data associated with the DMA request according to contents of said register.

4. The DMA controller according to claim 2, further comprising a control terminal for receiving a control signal for enabling or disabling writing of trace data into said trace buffer from a debugging interface circuit disposed outside said DMA controller, wherein said write control circuit enables or disables the writing of the trace data associated with the DMA request selected by said arbitration circuit in said trace buffer according to the control signal.

5. The DMA controller according to claim 1, further comprising a trigger circuit for triggering the writing of the trace data associated with the DMA request selected by said arbitration circuit in said trace buffer when a predetermined trigger condition is satisfied.

6. The DMA controller according to claim 5, wherein said trigger circuit selects one trigger condition from among a plurality of trigger conditions, and, when the selected trigger condition is satisfied, said trigger circuit triggers the writing of the trace data associated with the DMA request selected by said arbitration circuit in said trace buffer.

7. The DMA controller according to claim 1, further comprising a write stopping circuit for stopping the writing of the trace data associated with the DMA request selected by said arbitration circuit in said trace buffer when said trace buffer is full.

8. The DMA controller according to claim 1, wherein said trace buffer is mapped into a part of an address space of a functional module disposed outside said DMA controller.

9. The DMA controller according to claim 1, further comprising a control terminal for receiving a read request signal indicating a request for reading of trace data, which is applied from outside said DMA controller, and a read circuit for reading trace data from said trace buffer in response to the read request signal and for outputting the trace data to outside said DMA controller.

10. The DMA controller according to claim 1, further comprising a control terminal for receiving a read request signal indicating a request for reading of trace data from a debugging interface circuit disposed outside said DMA controller, and a read circuit for reading trace data from said trace buffer in response to the read request signal and for outputting the trace data to said debugging interface circuit.

11. A semiconductor integrated circuit comprising:
a DMA controller including an arbitration circuit for arbitrating among a plurality of channels so as to select a DMA request from among a plurality of DMA requests accepted by way of the plurality of channels according to priorities assigned to the plurality of channels in advance, and a trace buffer for storing only trace data associated with the DMA request selected by said arbitration circuit, said trace data including channel numbers, transfer addresses of channels and request factor data;
a functional module connected to said DMA controller by way of a bus;
a bus control means for arbitrating between said DMA controller and said functional module for right to use said bus; and
a debugging interface circuit having an access function of accessing either said functional module or said DMA controller according to a command applied thereto, and a debugging function.

12. The semiconductor integrated circuit according to claim 11, wherein said DMA controller further comprises a write control circuit for enabling or disabling writing of the trace data associated with the DMA request selected by said arbitration circuit in said trace buffer.

13. The semiconductor integrated circuit according to claim 12, wherein said write control circuit includes a register for controlling writing of trace data in said trace buffer and said write control circuit enables or disables the writing of the trace data associated with the DMA request according to contents of said register.

14. The semiconductor integrated circuit according to claim 12, further comprising a control terminal for receiving a control signal for enabling or disabling writing of trace data into said trace buffer, wherein said write control circuit enables or disables the writing of the trace data associated with the DMA request selected by said arbitration circuit in said trace buffer according to the control signal applied thereto by way of said control terminal.

15. The semiconductor integrated circuit according to claim 12, wherein said debugging interface circuit outputs a control signal for controlling writing of trace data in said trace buffer to said DMA controller according to a certain command applied thereto, and wherein said DMA controller further comprises a control terminal for receiving the control signal and said write control circuit enables or disables the writing of the trace data associated with the DMA request selected by said arbitration circuit in said trace buffer according to the control signal.

16. The semiconductor integrated circuit according to claim 11, wherein said DMA controller further comprises a trigger circuit for triggering the writing of the trace data associated with the DMA request selected by said arbitration circuit in said trace buffer when a predetermined trigger condition is satisfied.

17. The semiconductor integrated circuit according to claim 16, wherein said trigger circuit selects one trigger condition from among a plurality of trigger conditions, and, when the selected trigger condition is satisfied, said trigger circuit triggers the writing of the trace data associated with the DMA request selected by said arbitration circuit in said trace buffer.

18. The semiconductor integrated circuit according to claim 11, further comprising a write stopping circuit for stopping the writing of the trace data associated with the DMA request selected by said arbitration circuit in said trace buffer when said trace buffer of said DMA controller is full.

19. The semiconductor integrated circuit according to claim 11, wherein said trace buffer of said DMA controller is mapped into a part of an address space of said functional module.

20. The semiconductor integrated circuit according to claim 11, wherein said DMA controller further comprises a control terminal for receiving a read request signal indicating a request for reading of trace data from said debugging interface circuit, and a read circuit for reading trace data from said trace buffer in response to the read request signal and for outputting the trace data to said debugging interface circuit.

* * * * *